United States Patent
Rule

(10) Patent No.: US 11,021,591 B2
(45) Date of Patent: *Jun. 1, 2021

(54) BARRIER ADDITIVES

(71) Applicant: ColorMatrix Holdings, Inc., Berea, OH (US)

(72) Inventor: Mark Rule, Roswell, GA (US)

(73) Assignee: ColorMatrix Holdings, Inc., Berea, OH (US)

( * ) Notice: Subject to any disclaimer, the term of this patent is extended or adjusted under 35 U.S.C. 154(b) by 640 days.

This patent is subject to a terminal disclaimer.

(21) Appl. No.: 15/704,029

(22) Filed: Sep. 14, 2017

(65) Prior Publication Data

US 2018/0002496 A1  Jan. 4, 2018

Related U.S. Application Data

(63) Continuation-in-part of application No. PCT/US2017/021083, filed on Mar. 7, 2017.

(Continued)

(51) Int. Cl.
| | | |
|---|---|---|
| *C08K 13/02* | (2006.01) | |
| *C08K 3/26* | (2006.01) | |
| *C08K 9/04* | (2006.01) | |
| *C08L 67/02* | (2006.01) | |
| *C08J 3/205* | (2006.01) | |

(Continued)

(52) U.S. Cl.
CPC .............. *C08K 13/02* (2013.01); *C08G 63/00* (2013.01); *C08G 63/183* (2013.01); *C08J 3/2053* (2013.01); *C08J 3/223* (2013.01); *C08J 3/226* (2013.01); *C08J 5/18* (2013.01); *C08K 3/26* (2013.01); *C08K 5/521* (2013.01); *C08K 9/04* (2013.01); *C08K 9/12* (2013.01); *C08L 67/02* (2013.01); *C08J 2367/02* (2013.01);

(Continued)

(58) Field of Classification Search
CPC ... B32B 1/02; B32B 1/08; C08G 63/00; C08J 3/223; C08J 3/226; C08J 3/2053; C08K 5/521; C08K 9/04; C08K 9/12; C08K 13/02

See application file for complete search history.

(56) References Cited

U.S. PATENT DOCUMENTS

| | | |
|---|---|---|
| 7,135,508 B2 | 11/2006 | Chaiko et al. |
| 7,199,172 B2 | 4/2007 | Rule |

FOREIGN PATENT DOCUMENTS

| | | |
|---|---|---|
| WO | 2017160528 A1 | 9/2017 |

OTHER PUBLICATIONS

Tamarro et al., "Methods of Preparation of Novel Composites of Poly(caprolactone) and a Modified Mg/Al Hydrotalcite", Journal of Polymer Science, Part A: Polymer Chemistry vol. 43, 2281-2290 (2005).

(Continued)

*Primary Examiner* — Walter Aughenbaugh
(74) *Attorney, Agent, or Firm* — John H. Hornickel; Michael J. Sambrook

(57) ABSTRACT

The present invention relates to processes for making compatibilized high aspect ratio barrier additives and polymer compositions that comprise compatibilized high aspect ratio barrier additives. The invention also relates to compositions produced by these processes, and articles formed from polymer compositions of this invention. The barrier additives provide passive barriers to gas molecules such as (Continued)

oxygen and carbon dioxide minimizing transit of such molecules through sidewalls of polymer articles containing the barrier additives.

10 Claims, 2 Drawing Sheets

Related U.S. Application Data

(60) Provisional application No. 62/308,297, filed on Mar. 15, 2016, provisional application No. 62/452,033, filed on Jan. 30, 2017.

(51) Int. Cl.
    *C08J 5/18* (2006.01)
    *C08J 3/22* (2006.01)
    *C08G 63/00* (2006.01)
    *C08G 63/183* (2006.01)
    *C08K 5/521* (2006.01)
    *C08K 9/12* (2006.01)

(52) U.S. Cl.
    CPC ..... *C08J 2491/00* (2013.01); *C08K 2003/267* (2013.01); *C08K 2201/008* (2013.01)

(56) References Cited

OTHER PUBLICATIONS

Bugatti et al., "Nano-hybrids incorporation into poly(caprolactone) for multifunctional applications: Mechanical and barrier properties". European Polymer Journal, 46 (2010) 418-427.
Sorrentino et al. "Incorporation of Mg—Al hydrotalcite into a biodegradable Poly(caprolactone) by high energy ball milling." Polymer 46 (2005) 1601-1608.
Hsu et al., "Isothermal Crystallization Kinetics of Poly(3-hydroxybutyrate)/Layered Double Hydroxide Nanocomposites." Journal of Polymer Science: Part B: Polymer Physics, vol. 44, 3337-3347 (2006).
Zhou et al., "Strong interfacial attrition developed by oleate/layered double hydroxide nanoplatelets dispersed into poly (butylene succinate)." Journal of Colloid and Interface Science, 349 (2010) 127-133.
Filho et al., "Percolated Non-Newtonian Flow for Silicone Obtained from Exfoliated Bioinorganic Layered Double Hydroxide Intercalated with Amino Acid" (Applied Clay Science, 55, pp. 88-93 2012).
Xie et al., "Bio-Nanocomposite Films Reinforced with Organo-modified Layered Double Hydroxides: Preparation, Morphology, and Properties" (Applied Clay Science, 126, pp. 72-80 2016).
Kish, "Hydrolure Technical Data Sheet" (2001).
Ciba, "Hycite® Acid Scavenger" (2004).
Mitsubishi Gas, "Introduction to MGC Polyamides" (2013).
ISA/EP, ISR for WO2017160528 (2017).
ISA/EP, Written Opinion for WO2017160528 (2017).

BARRIER ADDITIVES

CLAIM OF PRIORITY

This continuation-in-part application claims priority from PCT Patent Application Serial Number PCT/US2017/021083 filed on Mar. 7, 2017, which PCT Patent Application claims priority from both (a) U.S. Provisional Patent Application Ser. No. 62/308,297 filed on Mar. 15, 2016 and (b) U.S. Provisional Patent Application Ser. No. 62/452,033 and filed on Jan. 30, 2017, both of which are incorporated by reference.

FIELD OF THE INVENTION

The invention relates to processes for making compatibilized high aspect ratio barrier additives and polymer compositions that comprise compatibilized high aspect ratio barrier additives. The invention also relates to polymer compositions produced by these processes, and articles formed from polymer compositions of this invention.

BACKGROUND OF THE INVENTION

Polyesters, especially poly(ethylene terephthalate) (PET), are versatile polymers that enjoy wide applicability as fibers, films, and three-dimensional structures. A particularly important application for PET is for containers, especially for food and beverages. This application has seen enormous growth over the last 30 years, and continues to enjoy increasing popularity. Despite this growth, PET has some fundamental limitations that restrict its application in these markets. One such limitation is related to its permeability to gases such as oxygen and carbon dioxide.

A number of technologies have been developed to address this limitation. For example, polyester co-polymers and blends with improved barrier performance such as PET blends and copolymers containing isophthalic acid or 2,6-naphthtalenedicarboxylic acid have been developed, as well as blends of PET with MXD6 nylon. Other developments directed toward improving the barrier properties of PET include the deposition of organic and inorganic barrier coatings (such as epoxy-amine, graphitic, and $SiO_x$ coatings) and multilayer structures comprising high-barrier polymers such as EVOH or MXD6. However, each of these technologies, while effective at providing some level of barrier improvement have their own drawbacks, including excessive per-unit costs, high upfront costs, need for new specialized manufacturing equipment, high scrap rates, lack of robustness, and negative impacts on recyclability. As a consequence, their adoption and commercial success have been limited. Therefore, there remains a need for a barrier technology for PET that does not require a new manufacturing infrastructure or processing equipment, has minimal impact on cost, has no adverse impact on recyclability, and is robust and reproducible.

One technology that could meet these many requirements involves incorporation of inorganic barrier additives into PET thus forming PET composite compositions. When the additives possess a high aspect ratio, the resultant composites can in principle possess improved barrier properties at low addition levels.

However, despite the potential advantages for barrier improvement offered by such PET composites and the considerable effort by many to develop the same, development of suitable barrier additives for use in polyesters has been elusive. This lack of success is due to the many issues associated with dispersing a high-aspect ratio additive into any viscous, high molecular weight polymer, and in particular relates to the nature of the processes used to produce PET articles. Specifically, in most PET applications, be it as film, thermoformed sheet, or three dimensional containers, a solid PET form is heated above its glass transition temperature and is subjected to a biaxial orientation process, whereby the polymer is rapidly stretched (either simultaneously or sequentially) in two different directions to give an oriented product. While this stretching process produces lightweight, mechanically strong structures, it also subjects any barrier additive contained within to substantial forces which can fracture the inorganic barrier particles and/or cause void formation at the polymer-particle interface. Thus, while there have been scattered reports of exfoliated barrier additives being successfully incorporated into amorphous, un-oriented PET, invariably all barrier properties are lost upon biaxial orientation.

In addition to polyesters, a number of other polymers are used in applications where permeation of gases, water, or organic molecules is detrimental. For example, polyolefins are widely used to make pipes for natural gas transport, for gas tanks in automobiles, and for food packaging applications. Polydienes are used widely as rubber for structures such as pneumatic tires. Polyvinyls such as polyvinyl chloride, polystyrene, and acrylonitrile-butadiene-styrene (ABS) are also frequently used in applications where enhanced barrier performance would be desirable. Polyamides, which are used as barrier layers in some of these applications, would also benefit from the enhanced barrier performance arising from incorporation of high aspect ratio barrier additives. In spite of the potential benefits, use of high aspect ratio barrier additives is limited or non-existent in all of these materials because the technical challenges posed by incorporation of such barrier additives have yet to be overcome.

SUMMARY OF THE INVENTION

It should be recognized by persons having ordinary skill in the art that inorganic layered particles generally exist as stacks of layers strongly associated with each other through electrostatic forces, and that, as such, exhibit low apparent aspect ratios simply because of the number of layers in a composite particle. Thus, for example, in a typical graphite flake there may be thousands to hundreds of thousands of individual layers of graphene closely associated with each other. In order to increase the apparent aspect ratio of these layered particles, it is necessary to separate the individual layers of these particles from each other. One method to do this is to apply high levels of force on the inorganic particles; however, besides being energy intensive, such force also can have the effect of reducing the lateral dimensions (width and/or length) of the individual layers or stacks of layers. In addition, such efforts to separate the individual layers does not preclude the individual layers from reassembling into stacks after removal of such force.

In the present invention, intercalation of small molecules as compatibilizers is utilized to increase the spacing between the individual layers of the inorganic layered particles. When the small molecules bind tightly to the surfaces of the individual layers, the spacings between the layers are increased considerably and effectively because the electrostatic binding forces between the individual layers are more or less permanently reduced. Furthermore, the use of selected vehicles that can intercalate between the expanded layers further can reduce these electrostatic forces, and thus allow exfoliation of the individual layers.

However, it is not sufficient to exfoliate individual layers of a compatibilized barrier additive in a polymer matrix. Another important aspect of this invention is the recognition that there must be sufficient adhesion between the surface of the compatibilized barrier additive particles and the polymer matrix such that there is not significant void formation at the interface between the particles and the polymer. At the same time, the attractive forces between the polymer matrix and the barrier additive surfaces should not be so great that the barrier additive particles fracture rather than slip when under stress during polymeric compounding and molding operations.

It is thus one object of the present invention to disclose a method for selecting suitable layered inorganic barrier additives whose individual layers possess high aspect ratios, selecting compatibilizers for those additives that modify the surface chemistry of the individual layers of those barrier additives to enable at least intercalation and preferably exfoliation and promote adhesion in a polymer matrix, and selecting vehicles to further promote dispersion of intercalated or exfoliated compatibilized inorganic barrier additives into polymers.

A second object of the present invention is to disclose processes for preparing compatibilized high aspect ratio barrier additives.

A third object of the present invention is to disclose compositions comprising compatibilized high aspect barrier additives in polymeric articles.

A fourth object of the present invention is to disclose compositions comprising compatibilized high aspect barrier additive in oriented polymeric articles. These and other objects will become apparent in the following specification.

The present invention discloses a method for the selection of suitable inorganic barrier additives, selection of appropriate compatibilization agents, selection of appropriate vehicles, processes to modify and separate the layers of the inorganic barrier additives by reaction with one or more compatibilization agents, and processes to incorporate these compatibilized barrier additives into polymers such as PET. It is important in understanding the invention that recognition, itself, of key features ("Key Features") of the concepts to be used to effectuate the invention is an aspect of this invention just as much as the selection of the particular combination of ingredients used to obtain acceptable results.

Key Features of the present invention include selection of compatibilization agent(s) to obtain:

(a) a close correlation between the solubility parameters of the compatibilization agent/barrier additive combination and the polymer matrix;

(b) a close correlation between the solubility parameters of both the compatibilization agent/barrier additive combination, the polymeric matrix, and the vehicle;

(c) sufficiently long chain length in the compatibilization agent to substantially reduce the interlayer attractive forces of the inorganic layers of the barrier additives;

(d) sufficiently high surface energy on the surface of the compatibilized barrier additive to enable wetting/adhesion between the polymeric matrix and the compatibilized barrier additive particles;

(e) substantial lack of chemical reactivity (that is, little or no covalent bond formation) between the compatibilized surface of the barrier additive and the polymeric matrix;

(f) sufficiently low free volume and/or segmental mobility within and between the individual compatibilizer molecules such that transverse migration of permeant molecules is not substantially enhanced; and (g) substantial chemical stability of the compatibilization agent/barrier additive combination under polymer melt processing conditions.

It needs to be clarified that these seven Key Features are not equally important, that one having ordinary skill in the art will recognize without undue experimentation that one key feature may have a more significant effect on successful formulating, processing, and performing than another key feature. Furthermore, the importance of a particular feature may be dependent on the polymer into which an additive is incorporated or the processing such a polymer undergoes after such incorporation. But it remains that each of the seven Key Features is involved to a greater or lesser extent in establishing candidates for each of the concepts employed in the invention.

The present invention also discloses barrier additive compositions, obtained by use of the seven Key Features that provide improved barrier in polymeric articles, both as-molded without post-shaping application of stress and also after stressed orientation, preferably biaxial orientation.

The present invention further discloses compatibilized barrier additive compositions comprising intercalated and/or exfoliated layered inorganic particles dispersed in fluid media that can be dispersed into a molten polymer matrix under standard melt processing conditions.

The present invention further discloses a process to produce compatibilized barrier additives based on layered double hydroxides that avoid difficulties associated with prior methods.

In the present invention it should be understood that, to increase the apparent aspect ratio of a layered particle, it is sufficient to achieve complete separation of at least some groups or stacks of layers, and while preferred, it is not essential to achieve complete separation (exfoliation) of all or even some of the individual layers of the particles. Rather, multiple layers of particles can be considered exfoliated from other layers of particles if stacks of from about 2 to about 20 and preferably stacks of 2 to about 10 layers of barrier additives particles are separated from the original composite particles. While the ideal situation would be for each layer separated from each other layer, such perfection is unlikely in a large scale manufacturing operation.

Thus, the concept of the present invention presented below should not be discounted by counting the number of layers in a stack so long as the apparent aspect ratio of the barrier additives is increased over that of the original inorganic layered particles. The effects of exfoliation on distribution and dispersion of the stacked inorganic particles in the polymeric articles achieve unexpectedly improved performance, as this disclosure demonstrates.

These and other features of the present invention will become apparent in the following detailed description of the invention, in combination with the photographic evidence of FIGS. 1-3 and depiction of FIG. 4.

DETAILED DESCRIPTION OF THE INVENTION

Figure 1:
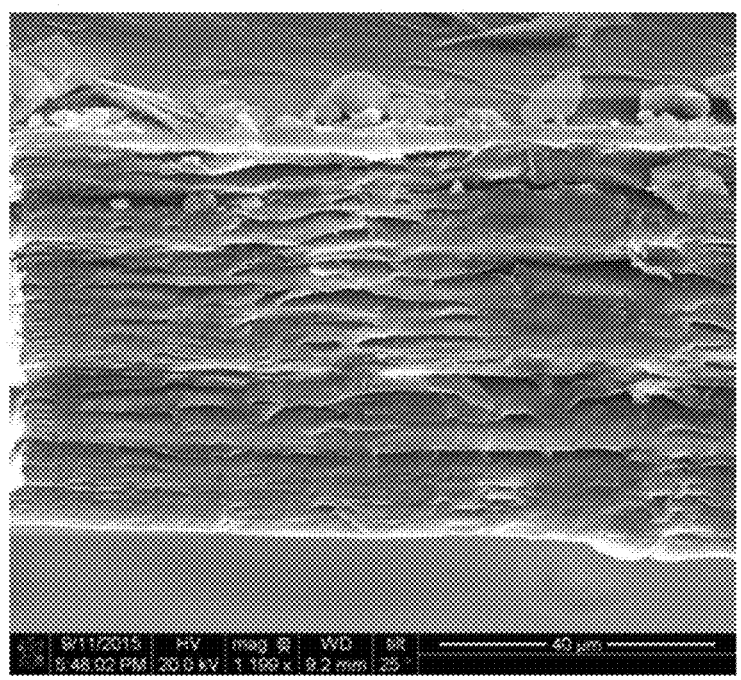
FIG. 1 is a SEM photo of a fracture surface of a bottle sidewall from Example 5, containing barrier additive from Example 3

The following detailed description discloses key elements necessary for obtaining exfoliated barrier additive-polymer compositions and provides preferred embodiments of the present invention.

Definitions

In the context of this invention, specific words and phrases are specifically defined as follows:

"Agglomerates" means clusters of particles bonded by weak physical forces and relatively easily separable to individual particles.

"Aggregates" means clusters of particles bonded by stronger chemical or sinter forces and relatively difficultly separable to individual particles.

"Aspect ratio" means the ratio of the average length of a particle divided by its thickness. Here the average length can be calculated as (length+width)/2 or (length×width)$^{1/2}$. As such, the aspect ratio of a barrier additive is a theoretical upper limit based on the lateral dimensions and layer thickness of the barrier additive particles. For clarification, length and width are lateral dimensions.

"Apparent aspect ratio" means the aspect ratio calculated from the Barrier Improvement Factor, defined below, observed for a selected permeant. As such, the apparent aspect ratio is an empirical measurement, and can be compared to the aspect ratio, defined above, for the same barrier additive to estimate the efficiency in exfoliation of individual layers of a barrier additive in a given polymer matrix.

"Barrier Improvement Factor" or "BIF" means the ratio of permeability for a control sample ($P_o$) to that of a test sample (P) for a specified permeant. Thus BIF=$P_o$/P.

"Compatibilization" means chemically modifying the surfaces of an inorganic barrier additive with at least one organic compatibilization agent, also identified throughout as a compatibilizer, such that the surfaces of the compatibilized barrier additive particles have solubility parameters similar to both the vehicle and the selected polymer.

"Electrostatic forces" means any non-covalent attractive force including ionic, Van der Waals, and dipole interactions.

"Inorganic barrier additive" means an inorganic layered solid, where the individual layers are held together by electrostatic forces rather than covalent bonds. An inorganic barrier additive is a precursor to a compatibilized barrier additive (defined below).

"Key Features" means those seven features identified above for a compatibilizer to have when interacting with an inorganic barrier additive to achieve a compatibilized barrier additive.

"Compatibilized barrier additive" means an inorganic layered solid that has been reacted with at least one compatibilizer.

"High aspect ratio" means having an aspect ratio greater than 250 and preferably greater than 1000.

"Exfoliation" means separation of an as-formed layered material, where the individual layers are initially strongly associated by electrostatic forces, to a degree such that the electrostatic forces are substantially dissipated freeing one layer from another layer, or as explained above, a small stack or group of layers from other layers.

"Intercalation" means insertion of polymer chains or other molecules between the layers of a layered material, where there may still be significant electrostatic forces between the individual layers which widens but does not totally free adjoining layers.

"Solubility parameters" refer to the combination of dispersive, polar, and hydrogen-bonding parameters unique for each chemical compound. Solubility parameters are often expressed in terms of MPa$^{1/2}$. The solubility parameters for a large number of liquids and polymers have been tabulated by Hansen and others (see, for example, *Hansen Solubility Parameters*, ISBN 0-8493-7248-8). Where solubility parameters are not available, Hydrophilic/Lipophilic Balance (HLB) is another useful measure for predicting compatibility and can be used to provide direction in selecting appropriate compatibilizers. Solubility parameters can also be calculated by group additivity methods, such as those outlined in *Properties of Polymers* (D. W. van Krevelen, ISBN 0-444-82877-x).

"Surface energy" is a measure of excess energy at the surface of a solid or liquid. Surface energy is often expressed as mJ/m$^2$ or erg/cm$^2$. Surface energy is synonymous with surface tension (expressed as mN/m or dyne/cm). Generally speaking, in order to achieve good wetting and adhesion between a solid and a polymeric liquid, the surface energy of the solid surface should be equal or greater than the surface energy of the liquid. Surface energy values for a wide range of liquids and solids have been tabulated by a number of authors (see, for example *Handbook of Adhesives*, 2nd ed. p 67-71) and *Polymer Handbook* 4$^{th}$ ed, p VI/521-541, ISBN 0-471-16628-6).

An alternative but equivalent formalism to surface energy is heat of mixing. In this formalism, the compatibilized barrier additive can be considered to be a two-dimensional polymer, and may have a negative (exothermic) or positive (endothermic) heat of mixing with preselected polymeric matrix depending on the specific attractive and repulsive forces present between the compatibilized barrier additive and the polymeric matrix. Specifically, in this formalism, the free energy of mixing can be expressed as $$\frac{\Delta G^M}{RT} = \frac{\Phi_A}{N_A}\ln\Phi_A + \frac{\Phi_B}{N_B}\ln\Phi_B + \Phi_A\Phi_B\chi + \frac{\Delta G_H}{RT}$$

where $N_A$ and $N_B$ are the number of polymer segments, $\Phi_A$ and $\Phi_B$ are the volume fractions of the two materials, $\chi$ is the Flory-Huggins interaction parameter, and $\Delta G_H$ is the free energy of specific chemical interactions between the two materials. (Macromolecules 22, 586 (1989)). In this formalism, $\chi$ is related to the difference in solubility parameters between the two materials:

$$\chi = \frac{V_B}{RT}[\delta_A - \delta_B]^2$$

and is always zero or positive. $\Delta G_H$ may be positive or negative, depending on the specific functional groups present in the two materials. Since in high polymers the number of polymer segments is large, all entropic terms become vanishingly small and $\Delta G^M/RT$ reduces to $$\Delta G^M/RT = \Delta H^M/RT = \Phi_A \Phi_B \chi + \Delta G_H/RT.$$

With this information, one can evaluate $\chi$ and $\Delta G_H$ independently to determine if a compatibilized barrier additive composition will have a positive or negative heat of mixing with a preselected polymer. Alternatively, one may utilize empirical calorimeter data with small molecules that are chemically similar to the polymeric material one wishes to blend with a specific compatibilized barrier additive. (See, for example, Polymer 33, p 775 (1992); Macromolecules 25, 6909 (1992); as well as readily available tables of heats of mixing data). If suitable surrogate molecules are selected, this approach inherently includes both the repulsive (endothermic) interactions arising from the difference in solubility parameters as well as any attractive (exothermic) forces arising from dipole-dipole, acid-base, or hydrogen bonding interactions. Hydrogen bonding interactions, for example, can provide up to or more than 5 calories/cm$^3$ of attractive force, while a difference in solubility parameters $\Delta\delta$ of 8 MPa$^{1/2}$ [(3.91 calories/cm$^3$)$^{1/2}$] corresponds to a repulsive force of 3.82 calories/cm$^3$ (when $\Phi_A=\Phi_B=0.5$), for a net attractive force greater than 1 calorie/cm$^3$.

Another variation on this approach is to look to the chemical literature on miscible polymer blends. Thus, for example Landry and coworkers (Journal of Applied Polymer Science 54, 991 (1994)) have reported on the miscibility of a number of polymers with poly(vinyl phenol), where hydrogen bonding provides the attractive chemical interaction to overcome repulsive forces. Similarly, Moskala et. al. (Macromolecules 17, 1671 (1984)) has reported on the miscibility of poly(vinyl phenol) with ethylene-vinyl acetate copolymers and Serman et. al. (Macromolecules 22, 2015 (1989)) have reported on the miscibility of poly(vinyl phenol-styrene) copolymers with poly(alkyl methacrylates). Rahman et. al (Macromolecular Chemistry and Physics 203, 653 (2002) have reported on the miscibility of poly(vinylidene fluoride) with PET, and Lu et. al. (Macromolecules 41, 141 (2008)) have reported on the miscibility of poly(ethylene succinate) with poly(ethylene oxide).

An advantage of the heat of mixing approach is that it can provide quantitative estimates of the net attractive forces between a compatibilized barrier additive and a selected polymer matrix. Thus, for example, if the net attractive force is 1 calorie/cm$^3$, it is easy to translate this into the attractive force in terms of atmospheres. 1 calorie/cm$^3$ is equivalent to an attractive force of 4.18 MPa (41.3 atmospheres)—in other words, 1 calorie/cm$^3$ of attractive force should be able to resist a separating force of 41.3 atmospheres.

"Vehicle" means a liquid into which compatibilized barrier additive is added to improve fluidity and processability prior to incorporation of the barrier additive into a polymer. In general, a vehicle should have solubility parameters similar to the intended polymer, and preferably with a difference of less than about 8 MPa$^{1/2}$ in order to minimize polymer/vehicle phase separation in the molded parts. The vehicle should also have solubility parameters similar to the compatibilized barrier additive, and preferably with a difference of less than about 8 MPa$^{1/2}$. The vehicle need not be a liquid at room temperature. Ideally, the vehicle will spontaneously intercalate between the compatibilized layers of the compatibilized barrier additive and promote at least some exfoliation to achieve a high apparent aspect ratio performance.

Selection of Compatibilizer

By selecting one or more compatibilizers that in aggregate have solubility parameters similar to those of the liquid vehicle and/or the polymer, the attractive forces between the layers of individual particles can be more easily disrupted and the compatibilized layers dispersed, first in the vehicle and then in a polymer melt. When the compatibilized barrier additive and the polymer have similar solubility parameters there will be little or no enthalpic driving force for re-agglomeration of the high aspect ratio individual barrier additive particles. This is particularly important for minimizing re-agglomeration in a polymer melt, because there the entropic factors favoring dispersion are small.

In addition to having similar solubility parameters as both the vehicle and polymer, there are seven other preferences ("Additional Preferences") for selection of the compatibilizer.

1. Sufficiently long chain lengths to minimize residual electrostatic attraction between the inorganic barrier additive particles (preferably greater than about 20 atoms long, and more preferably greater than about 30 atoms long), and to also allow intercalation of vehicle and polymer chains between the compatibilized barrier additive particles. This is especially important if the barrier additive without compatibilizer present is a layered solid with a low interlayer spacing.

2. Strong chemical or physical bonding of the compatibilizer to the surface of the barrier additive particles, such that there is little or no loss or migration of compatibilizer from the particle surface under solution or melt processing conditions. Loss of compatibilizer from the surface of the inorganic particles can result in re-agglomeration of the particles.

3. Sufficient thermal and chemical stability within the compatibilizer structure, such that there is little decomposition of the individual compatibilizer molecules under melt processing conditions.

4. Variation in the structure of individual compatibilizer molecules, such that there is a range of chain lengths. This variation increases the capability of vehicles and polymer chains to intercalate between the compatibilized barrier additive particle layers and within and between the compatibilizer molecules themselves, thus promoting increased rates of polymer intercalation and greater polymer-compatibilizer interaction and adhesion.

5. Sufficiently high surface energy (or sufficiently negative heat of mixing) at the portion of the compatibilizer molecules in direct contact with the polymeric matrix such that there is effective wetting and adhesion between the compatibilized barrier additive particles and the polymeric matrix such there is little or no void formation between the polymeric matrix and the additive particles.

6. Sufficiently low free volume and/or segmental motion within and between the compatibilizer molecules bonded to the surface of the inorganic barrier additive such that there is not excessive transverse motion of permeant molecules across the surface of the exfoliated barrier additive particles.

7. Little or no covalent bonding between the compatibilizer molecules and the polymer chains, such that on flexing or uniaxial or biaxial orientation the polymer chains can freely slip between and/or across the surface of or between the individual compatibilizer molecules, and thus not fracture the underlying inorganic barrier additive particles.

Heretofore, selection of surface treatment agents for layered materials have focused primarily on agents that would successfully intercalate into the layered solids, with only secondary consideration to their thermal stability or the interaction of the treated surface with a polymer matrix. Thus, for example, intercalation of montmorillonite clays has predominately focused on the use of quaternary ammonium salts with long-chain aliphatic hydrocarbon tails. While such treated clays do possess an expanded intergallery spacing, aliphatic quaternary ammonium salts have poor thermal stability, and the hydrocarbon tails have poor compatibility with relatively polar polymers such as PET or nylon. Similarly, anionic clays such as hydrotalcite have been intercalated with organic anions such as dodecyl sulfate, which succeeds in expanding the intergallery spacing, but is a poor choice as a compatibilizer for polymers, since uniform chain length and strong Van der Waals forces between the dodecyl groups leads to a densely packed surface structure which limits the ability of any polymer, let alone a polar one, to intercalate between the compatibilized barrier additive particles. Furthermore, the solubility parameters of the dodecyl tail are substantially different than PET or nylon, and hence there is a strong enthalpic driving force for aggregation or agglomeration of the treated particles. Finally, the surface energy of the aliphatic dodecyl tail is much lower than that of PET or nylon, and consequently will only be poorly wetted by the molten polymer, with concomitant void formation at the polymer/compatibilized barrier additive interface. Voids at the polymer/additive interface provide an easy route for small molecules such as oxygen or carbon dioxide gases to go around the barrier additive particles, resulting in reduced or no barrier improvement vs. the untreated polymer. This is especially true if the polymer is subsequently mechanically flexed or stretched, placing increased stresses at the interface between the dissimilar materials likely already having voids of incompatibility.

With respect to ensuring strong chemical bonding between the compatibilizer molecules and the surfaces of the inorganic barrier additive particles, it is preferable that the compatibilizer molecule have a functional end group that possesses a high association constant with the surfaces of the inorganic barrier additive. For inorganic barrier additives that have charge-balancing cations on the surface (such as montmorillonite), quaternary ammonium ions have been the functional group most often selected. For barrier additives that have charge-balancing anions on the surface (such as found in layered double hydroxides), carboxylate and sulfate have frequently been chosen.

In this invention, the layered inorganic barrier additive is preferably not a phyllosilicate because phyllosilicates are difficult to obtain in high purity, generally have undesirable metals incorporated into their sheet structure, have relatively low ion exchange capacity and/or low aspect ratios, and require the use of thermally unstable organic cations to counterbalance their anionic charge.

However, for anionic systems, phosphonate and phosphate groups are preferred, because the association constant of the phosphonate and phosphate moieties with cations is far greater than that of carboxylate or sulfate. An additional benefit of phosphonate and phosphate functional groups are that they readily react with neutral metal hydroxides to form surface M-O—P bonds; thus, effectively all of the surfaces of a metal-hydroxide containing barrier additive can be populated with phosphonate or phosphate groups, resulting in a much higher surface density of compatibilizer molecules than would be otherwise obtained without such surface modification. In addition, by covalently reacting with the metal hydroxides, the phosphonate or phosphate groups are effectively rendered non-extractable. For neutral surfaces other than silicate, phosphonate and phosphate are again preferred, for the same reason as above. Phosphates and phosphonates are generally not preferred for silicate-rich inorganic barrier additives, because the P—O—Si bond is relatively unstable to hydrolysis. For silicate-rich barrier additives, compatibilizers based on organotrialkoxysilanes can be preferred.

With respect to possessing sufficient thermal and chemical stability under melt processing conditions, the nature of the functional end group and the rest of the compatibilizer molecule must be considered. As discussed previously, the thermal stability of quaternary ammonium ions is poor, because they readily undergo Hoffman elimination at relatively low temperatures. Sulfates and alkylsulfonates are similarly unstable. Carboxylates and arylsulfonates possess suitable thermal stability, as do phosphonates and phosphates. However, carboxylates and arylsulfonates form relatively weak coordination complexes with metal ions, and hence are prone to migration. Thus, taken together with the need for a high association constant, phosphonates and phosphates are preferred functional groups for anionic and neutral inorganic surfaces.

With respect to the remainder of the compatibilizer molecule, alkyl, aryl, sulfide, and ether functionalities possess suitable chemical inertness and thermal stability. Esters and amide functionalities are generally not preferred in compatibilizers used with condensation polymers due to the potential for interchange, which can result in covalent bonding between the compatibilized barrier additive particles and the polymer chains.

While both organic phosphate and phosphonates possess the chemical features desired for effective compatibilization of inorganic barrier additives, in general phosphates are preferred over phosphonates, because compared to organic phosphonates, mixed phosphate monoesters and phosphate diesters are more readily available at a lower cost, and with a wider selection of chain lengths and solubility parameters. Thus overall organic phosphates are generally preferred over organic phosphonates as compatibilization agents, especially for layered materials that are neutral or anionic in nature.

With respect to surface energy, the portion of the compatibilizer molecules in contact with the polymeric matrix should have a surface energy equal to or greater than the surface energy of the polymer matrix, because solid surfaces generally are only wetted by liquids with an equal or lower surface energy.

For polyesters or nylons, both which have high surface energies (>43 erg/cm$^2$), the selection of compatibilizer functionality is quite critical, especially when the polymeric matrix will be subjected to mechanical forces such as bending or stretching. Functional groups that can confer surface energies greater than about 43 erg/cm$^2$ include (but are not limited to) the halogens (chloride, bromide, and iodide), as well as aromatic rings, nitriles, sulfones, ketones, ethers, aromatic hydroxyls, hexafluoro-2-hydroxypropyl, phosphonate esters, nitrogen-containing aromatic rings, and amides. Due to their chemical and thermal stability, preferred functional groups for use in polyester and nylon matrices include aromatic rings, aromatic hydroxyls, ethers, chlorides, bromides, sulfones, carbonyls, and nitriles.

Depending on the nature of the preselected polymer matrix, other preferred functional groups may include aryl chlorides, aryl bromides, aryl carbonyls, nitrogen-containing aromatic rings, and aryl nitriles. Especially preferred are aromatic hydroxyls due to their ability to hydrogen bond to a number of functional groups, including those found in aliphatic and aromatic polyamides, aliphatic and aromatic main-chain polyesters, side-chain polyesters, main-chain and side chain polyketones, polycarbonates, and polyethers.

It should be noted that, compared to aliphatic hydroxyls, aromatic hydroxyls offer superior hydrogen bonding performance, but are chemically are relatively unreactive toward functional groups such as esters and amides. See, for example Landry et. al. (Macromolecules 26, 6299 (1993)); Zuza et. al. (Macromolecular Rapid Communications 27, 2026 (2006)); and Kuo (Journal of Polymer Research 15, 459 (2008)).

Generally speaking, the greater the density of functional groups at the interface of the barrier additive particles with the polymeric matrix the greater their surface energy will be. Thus, in general the greater the number of functional groups and compatibilizer molecules attached to the inorganic barrier additive per unit area, the greater the overall surface energy will be.

It is specifically contemplated that not all, or even a majority, of the compatibilizer molecules need to possess a functional group. It is sufficient that there is are enough compatibilizer molecules present to confer overall the degree of adhesion desired.

It is also specifically contemplated that the surface of the inorganic barrier additive may possess more than one type of compatibilizer molecule.

Conversely, polyolefins have a relatively low surface energy, and consequently a wider range of compatibilizer functionalities are available that meet the surface energy requirement for polyolefin matrices. However, the surface energy of the compatibilized barrier additive should still have a surface energy equal to or greater than the polymer matrix.

It is expressly contemplated that the attractive forces between a compatibilized barrier additive and a polyolefin matrix may be enhanced by incorporation of functional groups into the polyolefin that have enhanced acid-base, dipole-dipole, or hydrogen bonding attraction to the surface of the compatibilized barrier additive. The functional groups may be incorporated into the polyolefin matrix through copolymerization, oxidation, grafting, blending, or a combination of these techniques.

Whether it be polyesters or nylons on the one hand or polyolefins on the other hand, it should be understood that as the difference in surface energy between the additive surface and polymer matrix increases, the adhesive force between these surfaces also increases. In order to maximize adhesion, the surface energy of the polymer matrix can be decreased or the surface energy of the barrier additive can be increased.

The adhesive force required for a given application depends on the forces applied by a given permeant at the polymer-barrier additive interfaces. Thus, for an application (such as an oxygen barrier) where the pressure differential between the interior and exterior of a container is small, the adhesive strength needed would be less than one where the permeant creates greater differential pressures (such as a $CO_2$ barrier). Therefore, selection of appropriate compatibilizer functionality should be made taking into consideration the type of barrier application and end use conditions. However, the principles outlined above provide the requisite guidance for selection by a person having ordinary skill in the art of appropriate functionality of the barrier additive composition. It is also understood that, in general, compatibilizers that provide higher adhesive strengths will have broader applicability for barrier additive uses.

In another embodiment, to improve adhesion the surface energy of the polymer itself can be modified by incorporation of additives or copolymers. Thus, for example, the surface energy of PET can be reduced by incorporation of low surface energy co-monomers during polymerization or melt processing. It is contemplated that these surface-energy modifying additives can be introduced along with and concurrent with incorporation of a compatibilized barrier additive composition.

With respect to minimizing transverse motion of permeant molecules within the compatibilized barrier additive surface, several approaches are expressly contemplated. One approach is to have a sufficiently dense packing of the compatibilizer molecules to minimize the free volume within the compatibilizer matrix. A related approach is to have sufficiently high inter-chain interaction such that segmental motion of the chains is minimized. Yet another approach is to absorb into the compatibilizer matrix small molecules that fill any excess free volume. This approach is particularly useful where the compatibilizer matrix is relatively polar. In this instance, such as where the bulk of the compatibilizer matrix is composed of poly(ethylene glycol) units, selective absorption of small molecules such as water may allow the barrier performance of the composition to be reversibly tuned. Thus, for example, under high humidity conditions greater barrier performance may be obtained relative to those performances obtained at lower humidities.

Selection of Inorganic Barrier Additive

There are a number of criteria for selection of an appropriate inorganic barrier additive. First and foremost, the barrier additive should be a layered material wherein the layers are held together by electrostatic forces, as opposed to covalent bonding. Furthermore, at least small molecules must be capable of intercalating between the layers of the un-compatibilized additive.

Additional desirable criteria for an appropriate inorganic barrier additive are listed as follows.

The aspect ratio of the individual layers must be high enough such that substantial barrier can theoretically be obtained with reasonable loadings of the additive in a polymer matrix. For this reason, the aspect ratio of the individual layers should be at least 250, 500, 750 or more, and desirably greater than 1000, and preferably as large a number as possible, any number in multiples of 50 above 1000. It is important to recognize that these aspect ratios are much greater than aspect ratios found in nanoclays such as montmorillonite, for example, (with an aspect ratio of about 100 to 250) thereby providing in association with exfoliation and orientation a considerably longer tortuous path for a gas molecule to move from beyond one surface of the polymer article to beyond the opposing surface of that polymer article.

The surfaces of the individual layers of the barrier additive should have a high density of sites reactive to the chosen compatibilizer(s). The reason for this is three-fold:

First, if there is a low density of sites, the compatibilizer molecules will only sparsely populate the surface of the individual layers, and will generally lie flat against the surface rather than extending away from the surface. If the compatibilizer molecules lie flat on the surface, there will be only relatively small increases in the separation between layers and relatively small reductions in the electrostatic forces holding the layers together. For this reason, layered materials such as vermiculites, micas, and montmorillonites, which have a relatively low density of reactive sites are less preferred as inorganic barrier additives. In contrast, layered double hydroxides, which are noted for their high charge density, are relatively preferred.

Second, if there is a low density of compatibilizer molecules on the surface, there is a potential for interdigitation of compatibilizer molecules between adjacent barrier additive particles, decreasing the interlayer distance between adjacent particles and increasing the attractive forces between the particles, which in turn increases the difficulty in achieving intercalation and exfoliation.

Third, the lower the density of compatibilizer molecules on the surface of the barrier additive particles, the greater the potential for transverse migration of permeant molecules within the compatibilized matrix.

Ease of intercalation of small molecules between the individual inorganic barrier additive particles is another important criterion, since intercalation of small molecules can increase the spacing between the layers, which facilitates the intercalation of larger compatibilizer molecules into the interlayer spacing.

Ready availability of high purity, high aspect ratio crystalline material with a low degree of defects is another important criterion. In this regard clays such as montmorillonite are relatively un-preferred, since particles with lateral dimensions greater than about 250 nm are difficult to obtain. Moreover, montmorillonite is difficult to synthesize, and consequently is generally only available as a mined material of variable composition and quality. The same holds true for micas and vermiculites. In contrast, high purity layered double hydroxides with very large lateral dimensions (up to 25 microns or greater) with a general formula of $M^{+2}_{8-x}M^{+3}_{x}(OH)_{16} \cdot 4H_2O \cdot (Y^{-a})_{x/a}$ (where Y is a charge-balancing anion and a is its charge) can be readily synthesized under controlled conditions. With an individual layer thickness of about 0.78 nanometers, the layers of these layered double hydroxides can have aspect ratios greater than 30,000.

A further advantage of layered double hydroxides is that a number of divalent/trivalent metals that can be incorporated and a range of stoichiometries can be accommodated within the layered double hydroxide structure. Preferred layered double hydroxides are based on magnesium and aluminum metals and have the general formula $Mg_{8-x}Al_x(OH)_{16} \cdot 4H_2O \cdot (CO_3)_{x/2}$ (aluminum magnesium hydroxycarbonate, also known as hydrotalcite), due to the ease of synthesis of highly crystalline, high aspect ratio material, low manufacturing costs, and favorable regulatory status for use in food, beverage, and medicament packaging. Especially preferred are layered double hydroxides with the approximate formula of $Mg_6Al_2(OH)_{16} \cdot 4H_2O \cdot (CO_3)$.

Selection of Vehicle

In the context of this invention, the function of a vehicle is to increase the interlayer spacing between compatibilized barrier additive particles by intercalating between the individual particles layers, thus allowing easier and more rapid and more complete exfoliation of particle aggregates and agglomerates under shearing and more rapid intercalation of polymer chains and dispersion of individual or small stacks of layers under solution or melt processing conditions. While solid vehicles are expressly contemplated in the present invention, vehicles that are liquid at or near room temperature are generally preferred.

In order to increase the interlayer spacing between the individual particles of barrier additive, the solubility parameters of the vehicle should be similar to those of the compatibilizer populating the surface of the particles. Otherwise, phase separation may occur on standing, resulting in aggregation of the barrier additive particles. Similarly, both the compatibilized surface of the barrier additive and the vehicle should have solubility parameters similar to those of the polymer into which the barrier additive is being incorporated; otherwise, phase separation and agglomeration of the barrier additive particles may occur during solution or melt processing.

In addition to similar solubility parameters, the vehicle should have sufficiently low mobility in the polymer melt that it does not migrate from between the interlayer spaces between individual particles substantially faster than polymer chains intercalate into those spaces.

Generally speaking, higher viscosity vehicles are preferred over lower viscosity vehicles, because higher viscosity vehicles not only possess lower mobilities but also can provide greater transfer of shear forces to the surfaces of compatibilized barrier additive particles, enhancing the rate of exfoliation of individual particles under mechanical shear either prior to or during melt processing and dispersion into a polymer matrix.

Finally, the vehicle should be relatively chemically inert to the polymer matrix and possess sufficient thermally stable under melt processing conditions. In the case of polyesters such as PET, vehicles such as polyethylene glycol dioleate, polyethylene glycol dibenzoate acetyl tributyl citrate and acetylated monoglycerides can have good compatibility, acceptable stability, and suitable mobility, while vehicles such as mineral oil have low compatibility. Especially preferred vehicles are low molecular weight polyesters and polyethers, such as poly(diethylene glycol adipate), poly (butylene glycol adipate), and random ethylene oxide-propylene oxide copolymers. For other polymers, different vehicles will be preferred. For example, for polyolefins such as HDPE, mineral oil and unsaturated vegetable oils are preferred vehicles.

Other Considerations

Polymers Benefiting from Barrier Additives

Polymers suitable for composites of the present invention may be any thermoset or thermoplastic polymer. Suitable thermoplastic polymers include but are not limited to polyesters, polyolefins, polyvinyls, polyamides, polyethers, polydienes, polyacrylates, polycarbonates, polysulfides, and the like. Suitable thermoset polymers include but are not limited to sulfur and peroxide crosslinked polydienes, unsaturated polyesters, epoxies, polyurethanes, polyacrylates, and the like.

Processing of Barrier Additives into Polymers

Incorporation of the compatibilized barrier additive into the polymer can be accomplished by any suitable means, including (1) via adding the barrier additive to a solution of polymer precursors followed by polymerization, (2) via adding the barrier additive to a solution of the polymer followed by removal of solvent, or (3) via adding the barrier additive to molten polymer. Of these, adding the barrier additive to molten polymer is generally preferred because of greater economies of production.

Where the compatibilized barrier additive is added to a polymer solution or a solution of polymer precursors, the solvent or polymer precursors may also serve the function of a vehicle. Where the barrier additive is added to a molten polymer the use of a compatible liquid or solid vehicle is generally preferred.

Amount of Barrier Additive in Polymer Composition

The amount of barrier additive utilized in the polymer composition should be sufficient to achieve the intended barrier effect. The amount of barrier improvement can be predicted using the following equation [see E. L. Cussler et. al., Journal of Membrane Science, 254 (2005) 21-30]:

$$BIF = 1 + (\varphi \cdot \alpha)^2 / [4 \cdot (1 - \varphi)]$$

where BIF is the "barrier improvement factor", $\alpha$ is the aspect ratio, and $\varphi$ is the volume fraction of the barrier additive. In practice, the BIF obtained will generally be lower than the value calculated using the above equation, due to intercalation without complete exfoliation and/or fragmentation of barrier additive particles during processing. The amount of barrier improvement observed will also be at least somewhat dependent on the affinity of the permeant for the compatibilized surface of the barrier additive. Thus, for example, if the compatibilized barrier additive is relatively polar, the surface of the particles may accumulate a relatively large concentration of polar permeant molecules (such as water vapor), and hence may exhibit a relatively lower barrier improvement for that permeant than for a relatively non-polar permeant (such as carbon dioxide or oxygen gas). It is expressly contemplated that such a selective barrier improvement characteristic can be employed to achieve selective permeation performance, such as that desired in membrane separations.

Amount of Compatibilizer in Barrier Additive Particles

The amount of compatibilizer required to achieve sufficient surface coverage of the barrier additive particles can be calculated a number of ways. For example, from the density and interlayer spacing, one can calculate the theoretical specific surface area (in $m^2$/gram) of the exfoliated barrier additive. Assuming a given surface area per molecule, one can then calculate the number of compatibilizer molecules required for 100% surface coverage. Using the average molecular weight of the compatibilizer, one can then calculate the grams of compatibilizer required per gram of inorganic barrier additive. Thus, for example, hydrotalcite has a reported density of 2.06 g/cm³ and a layer spacing of 0.78 nanometers. This translates to a theoretical surface area of 1244 $m^2$/gram. Assuming 0.2 $nm^2$ per compatibilizer molecule to achieve complete coverage and an average molecular weight of 863 g/mole for the compatibilizer, one would need 8.9 grams of compatibilizer per gram of inorganic barrier additive.

Alternatively, one can calculate the amount of compatibilizer required per gram of inorganic barrier additive based on the exchange capacity of the barrier additive. Thus, hydrotalcite with a molecular weight of 604 g/mole and two anions per mole would require a minimum of 2 moles of charge balancing compatibilizer per mole. Thus, with an average molecular weight of 863 grams/mole, a minimum of about 2.8 grams of compatibilizer should be used per gram of hydrotalcite in order to provide charge balance. If the hydrotalcite formula were $Mg_6Al_2(OH)_{16}.4H_2O.(CO_3)$, complete coverage would require four times as much compatibilizer, or 11.2 grams per gram of hydrotalcite.

One also can calculate the amount of compatibilizer required based on the total number of metal atoms per mole. Thus, for a hydrotalcite with a molecular weight of 604 g/mole and eight metal atoms per mole and a compatibilizer with an average molecular weight of 863 g/mol, 11.4 grams of compatibilizer would be needed per gram of hydrotalcite in order to have one compatibilizer molecule per metal atom.

Finally, for a phosphate or phosphonate compatibilizer, one can calculate the amount of compatibilizer required based on the total number of M-OH groups. Thus, for a hydrotalcite with 16 moles of M-OH groups per 604 grams of hydrotalcite and a compatibilizer comprising equal weights of mono and diester phosphates with an average molecular weight of 863 g/mole, about 14.6 grams of compatibilizer would be needed per gram of hydrotalcite in order to have a single P—OH moiety per each M-OH moiety.

As can be seen, the four methods described above for calculating the amount of compatibilizer required for complete coverage result in substantially similar values. Therefore, which method is utilized is relatively unimportant.

In general, if the surface fraction of compatibilizer is too low, there will be insufficient layer separation and a tendency for interdigitation of compatibilizer molecules between adjacent layers, which will increase the difficulty in separating individual layers. Conversely, as the fractional surface coverage of compatibilizer increases, the weight fraction of compatibilizer used increases along with the overall cost. The optimal fractional surface coverage will be a balance between these two factors, and can be readily determined by one of ordinary skill in the art by simply preparing a series of compatibilized barrier additives with different weight ratios of compatibilizer to inorganic layered material, and observing the ease of dispersion of the product into a vehicle or polymer matrix and the barrier improvement obtained. Other indicators can include differences in viscosity for different weight fractions and visual observation of particulates in a sample of otherwise clear PET. X-ray diffraction can also be employed to ascertain whether interdigitation is occurring via calculation of the layer spacing as a function of weight ratio of compatibilizer to inorganic layered material.

Based on these various considerations, for the preferred hydrotalcite as a barrier additive and the preferred organic phosphates as compatibilizers, the percent coverage should range from about 25% to 100%.

Importance of Solubility Parameters

With respect to solubility parameters, the difference in solubility parameters among the compatibilized barrier additive, the polymer, and vehicle should be as low as practical. The difference in solubility parameters between two different materials can be calculated using the following equation [see *Hansen Solubility Parameters*, ISBN 0-8493-7248-8]:

$$\Delta\delta = [(\delta_{d1}-\delta_{d2})^2 + (\delta_{p1}-\delta_{p2})^2 + (\delta_{h1}-\delta_{h2})^2]^{1/2}$$

where $\Delta\delta$ is the cumulative difference in solubility parameters, and $\delta_d$, $\delta_p$, and $\delta_h$ are the dispersive, polar, and hydrogen bonding parameters for the first and second materials, respectively. The lower the difference is solubility parameters (especially between the compatibilized barrier additive and the polymer matrix) the lower the repulsive forces that need to be overcome by specific dipole-dipole, acid-base, or hydrogen bonding interactions.

In general, it is preferable that $\Delta\delta$ be less than about 8 $MPa^{1/2}$ and more preferably less than about 6 $MPa^{1/2}$. However, because of inaccuracies in measuring or calculating individual solubility parameters, final optimization of polymer/compatibilizer, polymer/vehicle, and vehicle/compatibilizer combinations might require some limited experimentation well within the skills of a person having ordinary skill in this art. In this case, a useful method is to determine which vehicle has maximum solubility in the polymer in question, and then determine which compatibilizer/vehicle combination gives the minimum fluidity at a selected loading of compatibilized barrier additive. In general, lower fluidity of the compatibilizer/vehicle combination will correlate with greater dispersion of compatibilized barrier additive particles within the vehicle.

Exemplary compatibilizers for inorganic barrier additives intended for use in PET include polyethylene glycol phenyl ether phosphate (6 EO) (hereinafter referred to as P-6A), with a calculated $\Delta\delta$ relative to PET of 5.4 $MPa^{1/2}$, polyethylene glycol chlorophenyl ether phosphate (6 EO) (hereinafter referred to as PC1-6A), with a calculated $\Delta\delta$ relative to PET of 4.8 MPa$^{1/2}$, and polyethylene glycol tristyryl phenyl ether phosphate (16 EO) (hereinafter referred to as TSP-16A), with a calculated $\Delta\delta$ relative to PET of 2.6 MPa$^{1/2}$. In addition to having a good match in solubility parameters to PET, these compatibilizers exhibit relatively high surface energy and lack functionality that could react covalently with PET. Moreover, P-6A, PC1-6A, and TSP-16A possess a phosphate functionality and a range of chain lengths (6 EO and 16 EO are known to be just the average number of ethoxylates in each compatibilizer). P-6A and PC1-6A have an average chain length of about 22 atoms, and TSP-16A has an average chain length of about 58 atoms. Especially preferred are hydroxylated forms of P-6A and its higher EO content congeners, because of the high surface energy provided by hydroxylated aromatics (>50 erg/cm$^2$) and the ability of the aromatic hydroxyl groups to hydrogen bond to the carbonyl groups in PET.

Conversely, while polyethylene glycol tridecyl ether phosphate (6 EO) (hereinafter referred to as T-6A), has a calculated $\Delta\delta$ relative to PET of 5.3 MPa$^{1/2}$ and polyethylene glycol tridecyl ether phosphate (10 EO) (hereinafter referred to as T-10A), has a calculated $\Delta\delta$ relative to PET of 4.9 MPa$^{1/2}$, their use in PET is possible but much less preferred because the surface energy of the non-polar tridecyl end group is much lower than the surface energy of PET and there provide no functionality that can interact with PET via dipole-dipole, acid-base, or hydrogen-bonding interactions. Consequently, while barrier additives prepared with these compatibilizers will disperse into a PET matrix, there will be relatively poor adhesion between the barrier additive particles and the polymer matrix, especially where the polymer matrix is subject to mechanical bending or stretching. However, in instances where the polyester matrix is injection molded or compression molded without subsequent distortion of the polymer matrix, some level of adhesion and barrier improvement may still be obtained.

Exemplary compatibilizers for inorganic barrier additives intended for use in polyolefins such as HDPE include polyethylene glycol oleyl ether phosphate (4 EO) (hereinafter referred to as O-4A), with a calculated $\Delta\delta$ relative to HDPE of 5.5 MPa$^{1/2}$ and an average chain length of about 32 atoms. In addition to having a reasonable solubility match to HDPE, O-4A possesses a phosphate functionality, a range of chain lengths (4 EO is the average number of ethoxylates in O-4A), and a surface energy similar to HDPE. Where the polyolefin contains some level of functional groups (provided either through copolymers, grafts, or blends) the use of compatibilizers containing interacting functional groups may be beneficial.

Amount of Vehicle for Barrier Additive Particles

The purpose of a vehicle is to further increase the layer spacing between individual particles of barrier additive by intercalation/insertion between the layers. By increasing the layer spacing, the vehicle helps to minimize the opportunity for re-agglomeration of the individual particles, further reduce any residual electrostatic attraction between the particles, and provide a displaceable agent that can facilitate the intercalation/insertion of polymer chains into adjacent layers of the high aspect ratio particles.

The amount of vehicle utilized relative to the amount of compatibilized barrier additive should be sufficient to accomplish these objectives. In general, the amount of vehicle should be greater than about 20% of the weight of the total composition, and more preferably greater than about 30% of the total weight.

In the case of polyesters such as PET, preferred vehicles include but are not limited to polyethylene glycol dibenzoate and acetylated monoglycerides, which have good compatibility, acceptable stability, and suitable mobility. More preferred vehicles include but are not limited to higher viscosity vehicles such as poly(diethylene glycol adipate) and poly(ethylene oxide-ran-propylene oxide), which provide equivalent or better compatibility along with greater potential for transfer of shear forces during processing. Conversely, vehicles such as mineral oil have lower compatibility with PET and are not preferred for barrier additives intended for use with polyesters. For other polymers different vehicles will be preferred.

For purposes of illustration of selection of vehicles with suitable compatibility to PET and preferred hydrotalcite compatibilizers, polyethylene glycol dibenzoate (4EO) (hereinafter referred to as PEG-4 dibenzoate), has a calculated $\Delta\delta$ relative to PET of 1.9 MPa$^{1/2}$, a calculated $\Delta\delta$ relative to TSP-16A of 1.4 MPa$^{1/2}$, and a calculated $\Delta\delta$ relative to P-6A of 3.5 MPa$^{1/2}$. Acetylated castor oil monoglyceride has a calculated $\Delta\delta$ relative to PET of 4.1 MPa$^{1/2}$, a calculated $\Delta\delta$ relative to TSP-16A of 2.7 MPa$^{1/2}$, and a calculated $\Delta\delta$ relative to PC1-6A of 7.3 MPa$^{1/2}$. Poly(diethylene glycol adipate) has a calculated $\Delta\delta$ relative to PET of 2.3 MPa$^{1/2}$, a calculated $\Delta\delta$ relative to P-6A of 1.6 MPa$^{1/2}$, and a calculated $\Delta\delta$ relative to PC1-6A of 1.5 MPa$^{1/2}$. Poly(ethylene oxide-ran-propylene oxide) has a calculated $\Delta\delta$ relative to PET of 3.3 MPa$^{1/2}$, a calculated $\Delta\delta$ relative to P-6A of 1.8 MPa$^{1/2}$, and a calculated $\Delta\delta$ relative to PC1-6A of 1.2 MPA$^{1/2}$.

Exemplary vehicles for compatibilized inorganic barrier additives for use in polyolefins such as HDPE do include mineral oil, with a calculated $\Delta\delta$ relative to HDPE of 0 MPa$^{1/2}$ and a calculated $\Delta\delta$ relative to 0-4A of 5.5 MPa$^{1/2}$. Other vehicles with suitable compatibility for PET, HDPE, or others polymer can similarly be determined by one of ordinary skill in the art using the principles and seven Key Features outlined above.

The vehicles employed may be single compounds or mixtures. It is expressly contemplated that the vehicle may comprise the non-ionic conjugates of the compatibilizer. Thus, for example, where TSP-16A is the compatibilizer, the vehicle may comprise TSP-16-OH (tristyryl phenyl ethoxylate).

Optional Additives

Barrier additive compositions of the present invention may include additional conventional plastics additives in amounts that are sufficient to obtain a desired processing or performance property for the dispersion or polymer. The amount should not be wasteful of the additive nor detrimental to the processing or performance of the barrier additive composition. Those skilled in the art of thermoplastics mixing, without undue experimentation but with reference to such treatises as *Plastics Additives Database* (2004) from Plastics Design Library (Elsevier.com), can select from many different types of additives for inclusion into the dispersions of the present invention.

Non-limiting examples of optional additives include adhesion promoters; biocides (antibacterials, fungicides, and mildewcides); anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; oxygen scavengers; processing aids; release agents; silanes, titanates and zirconates; slip and anti-blocking agents; stabilizers; stearates; ultraviolet light absorbers; viscosity regulators; waxes; and combinations of them.

Processing

The preparation of barrier additive compositions of the present invention is uncomplicated. The barrier additive compositions of the present invention can be made in batch or continuous operations, and may be prepared by any known or novel technique. In a preferred embodiment, the barrier additive compositions are based on layered double hydroxides.

Prior methods to intercalate additives into layered double hydroxides required a multi-step operation. First, the tightly bound carbonate ion is displaced. While one would normally consider using an aqueous mineral acid such as hydrochloric or nitric acid, the layered double hydroxide structure is susceptible to degradation in aqueous acid at a pH below about 5. Therefore, typically the carbonate moiety is replaced by careful titration with dilute aqueous acid, and the resulting chloride (or nitrate) substituted layered double hydroxide is then treated with a pH 7 aqueous salt solution of the organic compatibilizer to be intercalated. Another approach is to calcine the layered double hydroxide at 450 deg C. to drive off carbon dioxide and water, and the calcined product is exposed to a neutral aqueous solution containing the desired intercalant with careful exclusion of atmospheric $CO_2$. Both of these methods result in an intercalated layered double hydroxide where the amount of intercalant is limited by the amount of $M+^3$ present in the structure. Attempts to incorporate a greater amount of compatibilizer through the use of the acid form in aqueous media have resulted in the partial destruction of the layered double hydroxide structure (see, for example Clearfield et. al, Microporous and Mesoporous Materials, 23(1): 97-18 Jun. 1998).

In this disclosure, the acid form of appropriate phosphate and phosphonate functionalized compatibilizers can be readily intercalated into layered double hydroxides in a single step without significant chemical degradation of the individual layers, if the intercalation is carried out in a substantially non-aqueous environment. Thus, for example, the acid form of organic phosphates can be added directly to suspensions of layered double hydroxides in solvents such as n-butanol, with intercalation and $CO_2$ loss occurring rapidly without substantial degradation of the intrinsic layered double hydroxide structure. Intercalation can be readily followed by a number of techniques, including monitoring the pH of the solution over time, monitoring the swelling of the layered double hydroxide via microscopy, and by following the generation of water via its removal with a Dean-Starke trap. Using this one step technique, the amount of phosphonate or phosphate incorporated is not limited by the amount of $M^{+3}$ present in the layered double hydroxide, thus allowing a much higher surface density of compatibilizer on the layered double hydroxide to be achieved. Moreover, in the resulting compatibilized layered double hydroxide, the phosphonate or phosphate groups are covalently bonded to the metal atoms, effectively eliminating the potential for subsequent migration, both affecting continuing compatibility and usage in the polymer article. Notably, under these process conditions there is little or no esterification of the organic phosphate by the alcohol due to the extreme inertness of phosphoric acids to esterification under normal conditions.

On completion of intercalation of the compatibilizer, an appropriate vehicle may be added and solvent removed by distillation and/or evaporation. Typically the product from this process is a compatibilized barrier additive ready for subsequent processing, storage and use. Further processing may include (but is not limited to) ball milling, bead milling, high speed shearing, ultrasonic shearing, twin screw compounding, and the like. Such treatment can serve to separate loosely bound aggregates that would otherwise remain associated during melt processing. However, excessive milling may lead to fragmentation of the barrier additive with loss of aspect ratio; therefore, the degree of milling should be the minimum required to separate loosely bound agglomerates of particles. More aggressive milling might be needed for aggregates of particles.

Incorporation of the compatibilized barrier additive into a preselected polymer may be via extrusion or injection molding techniques well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (Elsevier.com), one can make articles of any conceivable shape and appearance using dispersions of the present invention mixed into polymer resin(s) and optionally other ingredient(s). Similarly, the compatibilized barrier additive compositions may be incorporated into precursors to thermoplastic or thermoset compositions using known techniques.

Dilution or "let-down" ratios of the barrier additive compositions into the polymer resin can range from about 0.001% to about 10% and preferably from about 0.1% to about 2.5%, in order to achieve the barrier performance desired in the final product. Indeed, it is within the scope of this invention for the let-down ratio to be a range of every number combination between 0.001% and 10% without the necessity of specifically identifying each maximum and minimum of each possible range.

The following examples illustrate the practice of this invention. Concentrations are all expressed as weight percent unless otherwise noted.

EXAMPLES

The following materials were employed in the examples below:

Compatibilization Agents

Rhodafac RS-710E, is a polyethylene glycol tridecyl ether phosphate with an average of 10 EO units (referred to below as T-10A) with a first acid number of 66.9 (corresponding to an average molecular weight of 838 grams/mole). This compatibilizer satisfies the requirements of the Key Features identified above.

Crodafos T-6A is a polyethylene glycol tridecyl ether phosphate with an average of 6 EO units (referred to below as T-6A) with a first acid number of about 80 (corresponding to an average molecular weight of 701 grams/mole). This compatibilizer satisfies the requirements of the Key Features.

Crodafos T-16A, is a polyethylene glycol tridecyl ether phosphate with an average of 16 EO units (referred to below as T-16A) with an estimated average molecular weight of 1140 grams/mole. This compatibilizer satisfies the requirements of the Key Features.

Rhodafac RP-710 is a polyethylene glycol phenyl ether phosphate with an average of 6 EO units (referred to below as P-6A) with a first acid number of 100 (corresponding to an average molecular weight of 561 grams/mole). This compatibilizer satisfies the requirements of the Key Features. Dichloro, monochloro, monobromo, and hydroxylated adducts of P-6A also satisfy the requirements of the Key Features.

Stepfac TSP-PE is a polyethylene glycol tristyrylphenyl ether phosphate with an average of 16 EO units (referred to below as TSP-16A) with a first acid number of 29 (corresponding to an average molecular weight of 1934 grams/mole), and containing about 50 wt % TSP-16-OH. This compatibilizer satisfies the requirements of the Key Features.

Phenylphosphonic acid is an organic phosphonic acid with the chemical formula $C_6H_5PO_3H_2$. Phenyl phosphonic acid does not satisfy the requirements of the Key Features and was not useful as barrier additive compatibilizer as shown in a comparative example.

Inorganic Barrier Additives

Sasol Pural MG70 is a hydrotalcite with a molecular weight of 604 grams/mole (per 8 moles of metal atoms), an average particle size of ~25 microns, and a molecular formula of $Mg_6Al_2(OH)_{16}.4H_2O.(CO_3)$, referred to below as MG70. This barrier additive when used properly with compatibilizer and vehicle results in well-performing examples.

Boron Nitride is a layered inorganic material consisting of hexagonal arrays of boron and nitrogen and an interlayer spacing of 0.3 nm. Boron Nitride does not meet the requirements of the Key Features.

Vermiculite is a layered inorganic silicate with an approximate formula of $Mg_{1.8}Fe^{2+}_{0.9}Al_{4.3}SiO_{10}(OH)_2.4(H_2O))$ and a layer spacing of about 1 nm. Because of the low charge density on vermiculite it does not meet the requirements of the Key Features.

Vehicles

PEG-4 dioleate is a dioleyl ester of polyethylene glycol where the PEG has an average molecular weight of 200 grams/mole and approximately 4 EO repeat units. This vehicle when used properly with compatibilizer and barrier additive results in well-performing examples.

Acetyl tributyl citrate (referred to below as ATBC). This vehicle when used properly with compatibilizer and barrier additive results in well-performing examples.

Poly(diethylene glycol) adipate. This vehicle when used properly with compatibilizer and barrier additive results in well-performing examples.

Poly(ethylene glycol) dibenzoate. This vehicle when used properly with compatibilizer and barrier additive results in well-performing examples.

Grinsted Soft-N-Safe, is a hydrogenated and acetylated castor oil monoglyceride (referred to below as SNS). This vehicle when used properly with compatibilizer and barrier additive results in well-performing examples.

Trioctyltrimellitate. This vehicle did not perform well in a comparative example because of incompatibility with the compatibilizer due to its different solubility parameters.

Other Chemicals n-Butanol (referred to below as butanol) was used in the compatibilization steps of the examples to prepare the exfoliated barrier additive.

Example 1

10.0 grams of MG70, 33 grams of T-6A (about 2.8 molecules of phosphate per 8 metal atoms), and 50 grams butanol were placed in a 250 ml round bottom flask fitted with a magnetic stir bar, a Dean-Starke trap and a reflux condenser. The mixture was heated to gentle reflux with stirring for 8 hours and water of reaction was azeotropically distilled off. After water removal was complete, 51.1 grams of ATBC was added and the butanol was distilled off under partial vacuum. The resulting product was 88 grams of a viscous, opaque oil with a nominal hydrotalcite loading of 10.6%. The oil was then subjected to high-speed shearing for two minutes in a blender before bottling.

Example 2

10.0 grams of MG70, 40.0 grams of T-10A (about 2.9 molecules of phosphate per 8 metal atoms), and 50 grams butanol were placed in a 250 ml round bottom flask fitted with a magnetic stir bar, a Dean-Starke trap, and a reflux condenser. The mixture was heated to gentle reflux with stirring for 8 hours and water of reaction was distilled off. 60.0 grams of ATBC was then added and butanol was distilled off under partial vacuum. The resulting product was 104 grams of an oil with a nominal hydrotalcite loading of 9.1%. The oil was then subjected to high-speed shearing for two minutes in a blender before bottling.

Example 3

10.0 grams of MG70, 65.0 grams of T-16A (about 3.4 molecules of phosphate per 8 metal atoms), and 40 grams butanol were placed in a 250 ml round bottom flask fitted a magnetic stir bar, a Dean-Starke trap, and a reflux condenser. The mixture was heated to gentle reflux with stirring for 8 hours and water of reaction was azeotropically distilled off. After water removal was complete, 80 grams of ATBC was added and the butanol was distilled off under partial vacuum. The resulting product was 150 grams of a viscous, translucent oil with a nominal hydrotalcite loading of 6.45%. The oil was then subjected to high-speed shearing for two minutes in a blender before bottling.

Example 4

10.0 grams of MG70, 28.0 grams of P-6A (about 3.0 molecules of phosphate per 8 metal atoms), and 50 grams butanol were placed in a 250 ml round bottom flask fitted with a magnetic stir bar, a Dean-Starke trap, and a reflux condenser. The mixture was heated to gentle reflux with stirring for 8 hours and water of reaction was distilled off. 40.0 grams of ATBC was then added and butanol was distilled off under partial vacuum. The resulting product was 73 grams of an oil with a nominal hydrotalcite loading of 12.8%. The oil was then subjected to high-speed shearing for two minutes in a blender before bottling.

Example 5

The barrier additives from Examples 1, 3, and 4 were mixed with dried Indorama Refresh 1101 PET resin in the ratios specified in Table 1 and injection molded into 47.6 gram bottle preforms using a single screw, single cavity Arburg molding machine under standard PET processing conditions, along with a PET control containing 0.5% ATBC. The amount of barrier additive utilized was equivalent to 500 ppm of hydrotalcite (0.05 wt %). The preforms were then subjected to reheat stretch-blow molding into 2 liter bottles under standard blow-molding conditions. Sidewall sections were cut from each variable and tested for oxygen permeation using a Mocon Ox-Tran 2/61 at 23 deg. C. and 50% relative humidity. The measured permeabilities and calculated barrier improvement factor (BIF) relative to the control are reported in Table 1 below. No statistically significant reduction (less than about 5 percent improvement) in oxygen permeability was observed in any of the examples. But these experiments of Example 5 are useful in demonstrating the utility of "regrind" in use in compression molding, as seen in Table 2.

TABLE 1

(bottle sidewalls)

| ID | Description | (cc · mil/(100 in² · day)) | BIF |
|---|---|---|---|
| PET Control | 0.5% ATBC (control) | 0.787 | 1.000 |
| Example 1 | 0.47% additive | 0.781 | 1.008 |
| Example 3 | 0.78% additive | 0.778 | 1.011 |
| Example 4 | 0.39% additive | 0.798 | 0.986 |

Retained preforms were then ground to fine powders which were then dried and compression molded into amorphous films. Oxygen permeation of the amorphous films was measured using a Mocon Ox-Tran 2/61 at 23 deg. C. and 50% relative humidity. Results are tabulated in Table 2. Compared to the control, all samples exhibited unexpectedly significant barrier improvement (reduced oxygen permeability), of at least 30%. With this performance, one can either use less amounts of barrier additives to achieve the same results as occur when using MXD6/PET blends, or one can achieve better performance than using MXD6/PET blends when using the same weight % of MXD6. Typically, the amount of MXD6 used in such blends ranges from about 2 to about 8 weight percent resulting in a BIF of about 1.05 to 1.3. Stated alternatively, the BIF for amorphous films of Table 2 are equal or greater than the BIFs of amorphous MXD6-PET blends while using 90% less additive.

TABLE 2

(amorphous films)

| ID | Description | (cc · mil/(100 in² · day)) | BIF |
|---|---|---|---|
| PET Control | 0.5% ATBC (control) | 1.964 | 1.00 |
| Example 1 | 0.47% additive | 1.514 | 1.30 |
| Example 3 | 0.78% additive | 1.396 | 1.41 |
| Example 4 | 0.39% additive | 1.483 | 1.33 |

Figure 2:
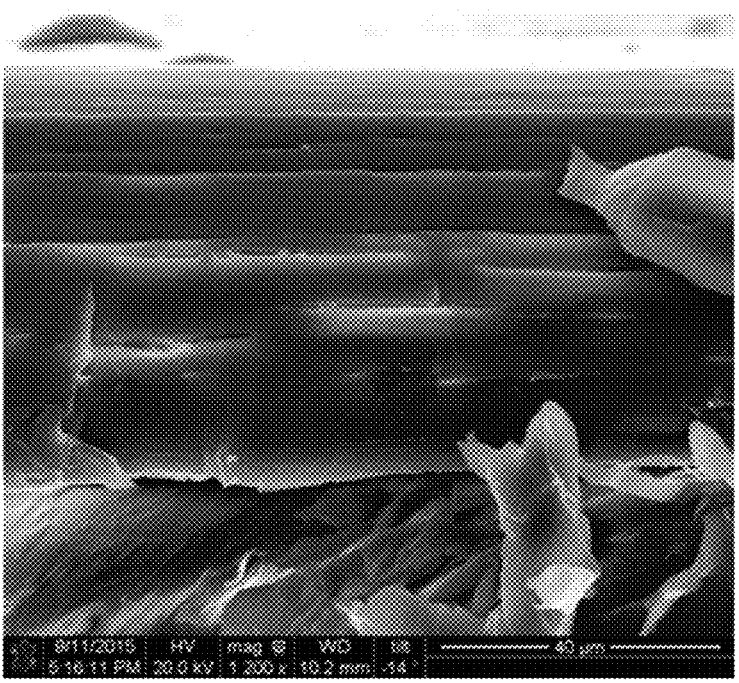
FIG. 2 is a SEM photo of a fracture surface of bottle sidewall from Example 5, containing barrier additive from Example 4.
Figure 3:
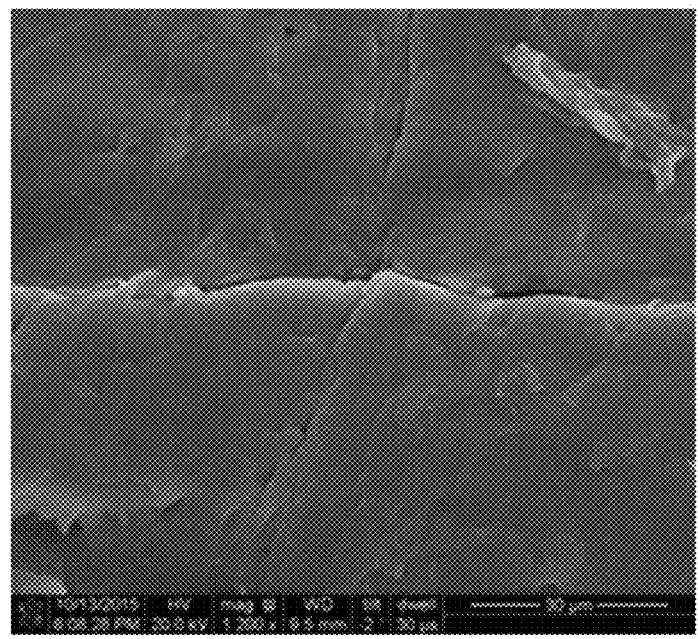
FIG. 3 is a SEM photo of a fracture surface of a PET bottle sidewall, serving as a control.

Bottle sidewalls from Example 5, made with barrier additives prepared in Examples 3 and 4, along with a PET control, were analyzed by scanning electron microscopy (SEM). Samples were prepared by freezing under liquid nitrogen and fracturing the frozen polymer. In FIGS. 1-3 are shown images of the edge of the fractured sidewalls. FIG. 1 shows extensive delamination of the PET throughout the sidewall, consistent with low to no adhesion between the barrier additive particles and the resin. FIG. 2 shows a much lower extent of delamination, but with still sufficient void formation to exclude any barrier improvement. The PET control shows essentially no delamination, consistent with resin that does not contain a barrier additive. Notably, the dimensions of the delaminations in both FIGS. 1 and 2 are consistent with barrier additive particles with lateral dimensions in the range of 20-40 microns, and the number density of the fractures in FIG. 1 is consistent with the number density expected for full exfoliation of the hydrotalcite.

Figure 4:
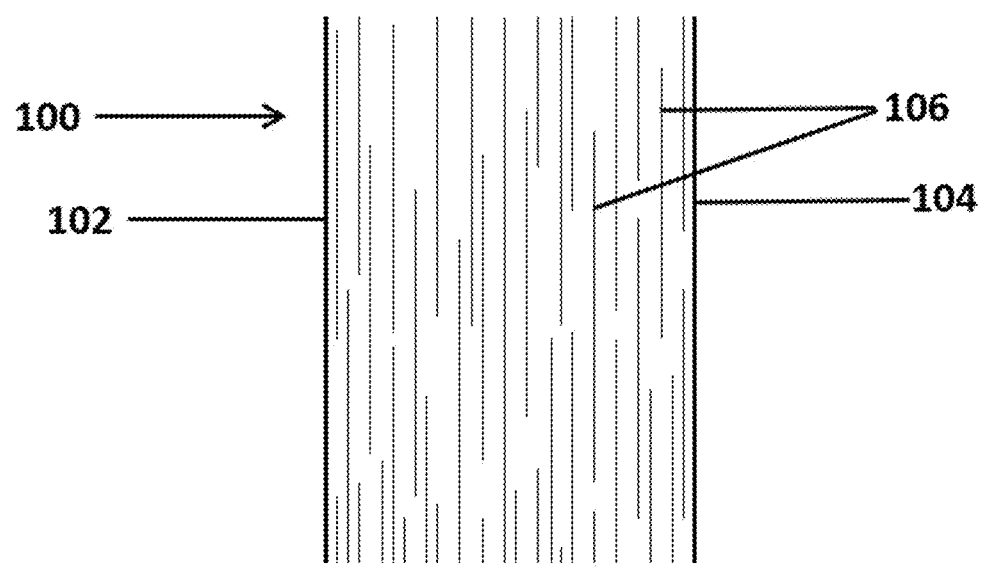
FIG. 4 is a depiction of the inorganic particles having high aspect ratios aligned within an oriented polymer article to provide a substantially tortuous path for any gas molecule to transit from one surface of the article to the opposite surface, whether keeping such molecules on the "inside" or the "outside."

FIG. 4 is a depiction of what is believed to be achieved when barrier additives of the invention are substantially exfoliated and then dispersed and oriented within the sidewall of a beverage container. The very high aspect ratio of the barrier additives and their dispersed orientation cause a passive barrier to be established within the sidewall of the container to minimize transit from one surface of the sidewall to the opposing surface of the sidewall.

In FIG. 4, a sidewall 100 of a beverage container has opposing surfaces 102 and 104. Within the sidewall 100 are many high aspect ratio barrier additives 106 aligned substantially parallel to surfaces 102 and 104. Any molecule attempting to cross from surface 102 to surface 104 will encounter an incredibly tortuous path, the essence of passive barrier performance, caused by the alignment and high aspect ratios of the many barrier additive particles 106 positioned across the thickness of sidewall 100.

These results, taken together, demonstrate that the barrier additives used in Examples 1, 3, and 4 were
(a) dispersed into the PET resin,
(b) were substantially exfoliated to achieve a high apparent aspect ratio,
(c) substantially retained their lateral dimensions, and
(d) retained at least some adhesion between the PET and the surface of the barrier particles in the amorphous film; but adhesion was effectively lost on biaxial orientation. The trend in extent of delamination observed between FIGS. 1 and 2 is consistent with the barrier additive from Example 4 (which had phenyl end groups) having greater but still insufficient adhesion to PET relative to the barrier additive from Example 3 (which had tridecyl end groups).

Example 6

Step 1: Chlorination of P-6A. A magnetic stir bar, 35.0 grams of P-6A and 20.0 grams of 31.45% hydrochloric acid were placed in a 250 ml round bottom flask. 20.0 grams of 35% $H_2O_2$ was next added dropwise at a rate sufficient to maintain the reaction temperature between 40 and 60 deg. C. After addition was complete mixture was stirred for an additional 4 hours. Next 60 ml butanol was added and water was removed by azeotropic distillation via a Dean-Starke trap. The pH of the distilled water was greater than 5, indicating the chlorination reaction went to completion. The product was nominally dichloro P-6A in butanol.

Step 2: 5.0 grams MG70 and 50 grams butanol were placed in a 250 ml round bottom flask fitted with a magnetic stir bar and a reflux condenser. The mixture was heated to reflux with stirring and water of hydration removed via a Dean-Starke trap. After water removal was complete, the dichloro-P-6A/butanol solution from Step 1 was added dropwise over a period of about 4 hours with continual azeotropic removal of water of reaction. The reaction mixture was refluxed for an additional 6 hours to ensure completion of reaction. After water distillation ceased, 20.8 grams of SNS was added and excess butanol distilled off while monitoring of the reaction temperature. After most of the butanol had distilled off at atmospheric pressure, the remaining butanol was distilled off at reduced pressure. The resultant hazy dispersion nominally contained 7.46% hydrotalcite and had about 7.5 phosphate groups per 8 metal atoms.

Example 7

Step 1: Chlorination of P-6A. A magnetic stir bar, 70.0 grams of P-6A and 20.0 grams of 31.45% hydrochloric acid were placed in a 250 ml round bottom flask. 38.0 grams of 35% $H_2O_2$ was next added dropwise at a rate sufficient to maintain the reaction temperature between 40 and 60 deg. C. After addition was complete mixture was stirred for an additional 4 hours. Next 60 ml butanol was added and water was removed by azeotropic distillation via a Dean-Starke trap. The pH of the distilled water was greater than 5, indicating the chlorination reaction went to completion. The product was nominally monochloro P-6A (PC1-6A) in butanol.

Step 2: 10.0 grams MG70 and 50 grams butanol were placed in a 250 ml round bottom flask fitted with a magnetic stir bar and a reflux condenser. The mixture was heated to reflux with stirring and water of hydration removed via a Dean-Starke trap. After water removal was complete, the PC1-6A/butanol solution from Step 1 was added dropwise over a period of about 4 hours with continual azeotropic removal of water of reaction. The reaction mixture was refluxed for an additional 6 hours to ensure completion of reaction. After water distillation ceased, 42.1 grams of SNS was added and excess butanol distilled off while monitoring of the reaction temperature. After most of the butanol had distilled off at atmospheric pressure, the remaining butanol was distilled off at reduced pressure. The resultant hazy dispersion contained 7.79% hydrotalcite and had approximately 7.5 phosphate groups per 8 metal atoms.

Example 8

Step 1: Bromination of P-6A. A magnetic stir bar, 56.0 grams of P-6A and 24.0 grams of 48.0% hydrobromic acid were placed in a 250 ml round bottom flask. 16.5 grams of 35% $H_2O_2$ was next added dropwise at a rate sufficient to maintain the reaction temperature between 40 and 60 deg. C. After addition was complete mixture was stirred for an additional 4 hours. Next 60 ml butanol was added and water was removed by azeotropic distillation via a Dean-Starke trap. The pH of the distilled water was greater than 5, indicating the chlorination reaction went to completion. The product was nominally monobromo P-6A (PBr-6A) in butanol. To this solution was added 20.0 grams of TSP-16A Step 2: 10.0 grams MG70 and 50 grams butanol were placed in a 250 ml round bottom flask fitted with a magnetic stir bar and a reflux condenser. The mixture was heated to reflux with stirring and water of hydration removed via a Dean-Starke trap. After water removal was complete, the solution from Step 1 was added dropwise over a period of about 4 hours with continual azeotropic removal of water of reaction. The reaction mixture was refluxed for an additional 6 hours to ensure completion of reaction. After water distillation ceased, 39.8 grams of SNS was added and excess butanol distilled off while monitoring of the reaction temperature. After most of the butanol had distilled off at atmospheric pressure, the remaining butanol was distilled off at reduced pressure. The resultant hazy dispersion contained 7.28% hydrotalcite and had approximately 6.6 phosphate groups per 8 metal atoms. The molar ratio of PBr-6A to TSP-16A was approximately 10:1.

Example 9

5.5 grams MG70 and 50 grams butanol were placed in a 250 ml round bottom flask fitted with a magnetic stir bar and a reflux condenser. The mixture was heated to reflux with stirring and water of hydration removed via a Dean-Starke trap. After water removal was complete, a solution of 79.0 grams TSP-16A (which was about 50% TSP-OH by weight) in 30 ml butanol was added dropwise over a period of about 4 hours with continual azeotropic removal of water of reaction. The reaction mixture was refluxed for an additional 6 hours to ensure completion of reaction. After water distillation ceased, 22.0 grams of ATBC was added and excess butanol distilled off while monitoring of the reaction temperature. After most of the butanol had distilled off at atmospheric pressure, the remaining butanol was distilled off at reduced pressure. The resultant hazy dispersion contained 5.16% hydrotalcite and had approximately 4.5 phosphate groups per 8 metal atoms. Microscopic examination revealed the presence of incompletely dispersed particles of hydrotalcite. To aid in breaking up loose agglomerates, the dispersion was subjected to high-speed blending for 5 minutes.

Example 10

The barrier additives from Examples 6-9 were mixed with dried Eastman Eastar EN001 copolymer PET resin in the ratios specified in Table 3 and molded into 23 gram, 557 ml (brimful capacity) straightwall bottles using a single stage Aoki injection/stretch-blow molding machine under standard PET processing conditions, along with a PET control containing 0.25% SNS. (Eastar EN001 copolymer PET is a CHDM (cyclohexanedimethanol)-containing copolymer that possesses a somewhat lower surface energy than grades of PET typically utilized for beverage containers.) The amount of barrier additive utilized was equivalent to 500 ppm of hydrotalcite (0.05 wt %) for examples 6, 7, and 8, and 375 ppm (0.0375%) for example 9. For moisture permeation measurements, to a bottle from each variable was added 5.0 grams of distilled water and the bottle tightly capped. The moisture permeation rate was measured by storing the bottles at 21 deg. C. and 45% relative humidity and periodically weighing the bottles to the nearest milligram. The barrier improvement factor (BIF) relative to the control was calculated from the rate of weight loss and are reported in Table 3 below (averaged values for days 1 through 10). No statistically significant reduction in moisture permeation rate was observed in any of the samples. (The reduction in BIF compared to the control reflects the differences in sidewall thickness of the different variables.) These moisture barrier results are indicative of relatively constant average thickness across the variables.

TABLE 3

| (moisture barrier) | | | |
|---|---|---|---|
| ID | Description | (mg/pkg · day) | BIF |
| PET Control | 0.25% SNS (control) | 22.0 | 1.00 |
| Example 6 | 0.67% additive | 23.0 | 0.96 |
| Example7 | 0.64% additive | 22.9 | 0.96 |
| Example 8 | 0.69% additive | 22.6 | 0.98 |
| Example 9 | 0.73% additive | 23.8 | 0.93 |

For carbon dioxide ($CO_2$) barrier testing, a bottle from each variable was filled with >5.5 grams of dry ice and loosely capped. When through sublimation the dry ice weight reached 4.00 grams the bottles were capped tightly. The carbon dioxide permeation rate was measured by storing the bottles at 21 deg C. and 45% relative humidity with periodic weighing of the bottles. The barrier improvement factor (BIF) relative to the control was calculated from the rate of weight loss and corrected for thickness using the BIF data from Table 3. These results are reported in Table 4 below (averaged values for days 10 through 70). As can be seen, relative to the control, statistically significant reduction in the $CO_2$ permeation rate was observed in all of the samples.

TABLE 4

| ID | Description | (mg/pkg · day) | BIF |
|---|---|---|---|
| (CO₂ barrier at 45% RH) | | | |
| PET Control | 0.25% SNS (control) | 13.8 | 1.00 |
| Example 6 | 0.67% additive | 11.8 | 1.22 |
| Example 7 | 0.64% additive | 11.8 | 1.21 |
| Example 8 | 0.69% additive | 13.1 | 1.08 |
| Example 9 | 0.73% additive | 12.5 | 1.19 |

Compared with Table 3, these results show that the compositions prepared in Examples 6-9 provide permeant-dependent permeability improvement in oriented PET, with no barrier improvement for polar $H_2O$ but with substantial barrier improvement for non-polar $CO_2$. Rearranging the equation $$BIF = 1 + (\varphi \cdot \alpha)^2 / [4 \cdot (1-\varphi)]$$

to $$\alpha = [(BIF-1) \cdot 4 \cdot (1-\varphi)]^{1/2} / \varphi$$

one can calculate the apparent aspect ratio for the barrier additives in the above examples. Thus, for Example 6, a $CO_2$ BIF of 1.22 obtained at a nominal hydrotalcite loading of 500 ppm and a density of 2.06 g/cc corresponds to an apparent aspect ratio of 2886.

Example 11

5.0 grams of MG70, 40.0 grams of T-6A (about 8 molecules of phosphate per 8 metal atoms), and 40 grams butanol were placed in a 250 ml round bottom flask fitted with a magnetic stir bar, a Dean-Starke trap and a reflux condenser. The mixture was heated to gentle reflux with stirring for 8 hours and water of reaction was azeotropically distilled off. After water removal was complete, 57 grams of PEG-4 dioleate was added and the butanol was distilled off under partial vacuum. The resulting product was 102 grams of a viscous, opaque oil with a nominal hydrotalcite loading of 4.9%. The oil was then subjected to high-speed shearing for two minutes in a blender before bottling.

Example 12

5.0 grams of MG70, 57.5 grams of T-10A (about 8 molecules of phosphate per 8 metal atoms), and 40 grams butanol were placed in a 250 ml round bottom flask fitted with a magnetic stir bar, a Dean-Starke trap and a reflux condenser. The mixture was heated to gentle reflux with stirring for 8 hours and water of reaction was azeotropically distilled off. After water removal was complete, 40 grams of PEG-4 dioleate was added and the butanol was distilled off under partial vacuum. The resulting product was 102 grams of a viscous, opaque oil with a nominal hydrotalcite loading of 4.9%. The oil was then subjected to high-speed shearing for two minutes in a blender before bottling.

Example 13

The barrier additives from Examples 11 and 12 were mixed with dried Indorama Refresh 1101 PET resin in the ratios specified in Table 5 and injection molded into 4.8 gram square plaques (1 mm thick and 6 cm wide) using a single screw, single cavity Arburg molding machine under standard PET processing conditions, along with a PET control. The amount of barrier additive utilized was equivalent to 980 ppm of hydrotalcite. The plaques were then subjected to either biaxial orientation in a T.M. Long machine at a stretching rate of 1 inch/second or compression molding in a Carver press. Compression molded plaques and oriented films were then tested for oxygen permeation using a Mocon Ox-Tran 2/61 at 23 deg. C. and 50% relative humidity. The measured permeabilities and calculated barrier improvement factor (BIF) relative to the control are reported in Table 5 below. Very significant barrier improvement factors were observed for the compression molded films, which was mostly lost even under the relatively slow orientation speeds of the T.M. Long machine. These results are consistent with the barrier additives of Example 11 and 12 being substantially exfoliated under the conditions of injection molding, but with the relatively non-polar tridecyl substituted phosphates T-6A and T-10A having insufficient adhesion to PET to maintain barrier under even relatively mild orientation conditions.

TABLE 5

| ID | Description | OP* | BIF | Film** |
|---|---|---|---|---|
| Example 11 pressed plaque | 2% Barrier | 0.619 | 2.78 | 5.00 |
| Example 11 stretched film | Additive | 0.848 | 1.14 | 5.00 |
| Example 12 pressed plaque | 2% Barrier | 0.727 | 2.37 | 4.21 |
| Example 12 stretched film | Additive | 0.939 | 1.03 | 5.50 |
| PET control pressed plaque | unmodified | 1.720 | — | 5.00 |
| PET control stretched film | PET | 0.967 | — | 3.65 |

*Oxygen Permeation (OP) measured at (cc · mil/(100 in² · day))
**Film = Average Thickness of Film (mils)

From the equation:

$$\alpha = [(BIF-1) \cdot 4 \cdot (1-\varphi)]^{1/2} / \varphi$$

the apparent aspect ratio of the barrier additive from Example 11 in a pressed plaque was 4,189.

Example 14

5.0 grams MG70 and 50 grams butanol were placed in a 250 ml round bottom flask fitted with a magnetic stir bar and a reflux condenser. The mixture was heated to reflux with stirring and water of hydration removed via a Dean-Starke trap. After water removal was complete, a solution of 45.0 grams of P-6A in 20 ml butanol was added dropwise over a period of about 4 hours with continual azeotropic removal of water of reaction. The reaction mixture was refluxed for an additional 6 hours to ensure completion of reaction. After water distillation ceased, 33.0 grams of poly(diethylene glycol adipate) (MW ~2,500 g/mol) was added and excess butanol distilled off while monitoring of the reaction temperature. After most of the butanol had distilled off at atmospheric pressure, the remaining butanol was distilled off at reduced pressure. The resultant hazy dispersion contained 6.0% hydrotalcite and had approximately 8 phosphate groups per 8 metal atoms. Microscopic examination revealed the presence of incompletely dispersed particles of hydrotalcite. To aid in breaking up loose agglomerates, the dispersion was subjected to high-speed blending for 1 minute.

Example 15

5.0 grams MG70, 0.5 grams hydrotalcite with an average particle size <1 micron, and 50 grams butanol were placed in a 250 ml round bottom flask fitted with a magnetic stir bar and a reflux condenser. The mixture was heated to reflux with stirring and water of hydration removed via a Dean- Starke trap. After water removal was complete, a solution of 45.0 grams of P-6A in 20 ml butanol was added dropwise over a period of about 4 hours with continual azeotropic removal of water of reaction. The reaction mixture was refluxed for an additional 6 hours to ensure completion of reaction. After water distillation ceased, 33.0 grams of SNS was added and excess butanol distilled off while monitoring of the reaction temperature. After most of the butanol had distilled off at atmospheric pressure, the remaining butanol was distilled off at reduced pressure. The resultant hazy dispersion contained 6.0% hydrotalcite and had approximately 8 phosphate groups per 8 metal atoms. Microscopic examination revealed the presence of incompletely dispersed particles of hydrotalcite. To aid in breaking up loose agglomerates, one portion of the dispersion was subjected to high-speed blending for 1 minute (Example 15A) and another portion was blended for 10 minutes (Example 15B). It was observed that the viscosity of 15B was much greater than 15A.

Example 16

5.0 grams MG70 and 40 grams butanol were placed in a 250 ml round bottom flask fitted with a magnetic stir bar and a reflux condenser. The mixture was heated to reflux with stirring and water of hydration removed via a Dean-Starke trap. After water removal was complete, a solution of 70.8 grams of TSP-16A (chain length of about 58 atoms and which was about 50% TSP-OH by weight) in 30 ml butanol was added dropwise over a period of about 4 hours with continual azeotropic removal of water of reaction. The reaction mixture was refluxed for an additional 6 hours to ensure completion of reaction. After water distillation ceased, 25.3 grams of poly(ethylene glycol) dibenzoate was added and excess butanol distilled off while monitoring of the reaction temperature. After most of the butanol had distilled off at atmospheric pressure, the remaining butanol was distilled off at reduced pressure. The resultant hazy dispersion contained 4.95% hydrotalcite and had approximately 4.0 phosphate groups per 8 metal atoms. To aid in breaking up loose agglomerates, the dispersion was subjected to high-speed blending for 1 minute. Microscopic examination of the resulting clear dispersion showed essentially no residual particles, indicating the compatibilized barrier additive was well dispersed in the vehicle.

Example 17

The barrier additives from Examples 14, 15A, 15B and 16 were mixed with dried Indorama Refresh 1101 PET resin in the ratios specified in Table 6 and injection molded into 20.0 gram preforms using a single screw, single cavity Arburg molding machine under standard PET processing conditions, along with a PET control containing 0.5% SNS. The amount of barrier additive utilized from Example 14 and 15 was equivalent to 500 ppm of hydrotalcite (0.05 wt %), and 350 ppm hydrotalcite (0.035%) for Example 16. The preforms were then subjected to reheat stretch-blow molding into 500 milliliter bottles under standard blow-molding conditions.

Barrier testing was conducted as follows: to the above variables (and a control) was added ~3 grams of ethyl acetate (a surrogate for carbon dioxide). After capping with a foil seal (held in place with a plastic cap), the weight of the bottles was monitored over time. After about 20 days ethyl acetate permeation commenced. After 33 days the rate of loss of ethyl acetate and the corresponding barrier improvement factor was calculated. Those results are tabulated in Table 7. All variables except 15A exhibited substantial barrier improvement relative to the control. Additional observations are that (a) Example 14, which was compositionally identical to Example 15A except for the use of the higher viscosity poly(diethylene glycol adipate) instead of SNS as a vehicle, gave much higher barrier (a BIF of 1.77 vs. 1.03) at the same blending time (1 minute);

(b) Example 15B gave much higher BIF than 16A (1.44 vs. 1.03), demonstrating that longer blending time resulted in a higher degree of exfoliation of the barrier additive; and (c) even with a reduced hydrotalcite loading, Example 16 gave significant barrier using poly(ethylene glycol dibenzoate) as the vehicle.

TABLE 6

| (500 ml bottles) | | | |
| --- | --- | --- | --- |
| ID | Description | (mg EtOAc/day) | BIF |
| PET Control | 0.5% SNS (control) | 19.8 | 1.00 |
| Example 14 | 0.83% additive | 11.2 | 1.77 |
| Example 15A | 0.83% additive | 19.3 | 1.03 |
| Example 15B | 0.83% additive | 13.7 | 1.44 |
| Example 16 | 0.71% additive | 15.7 | 1.26 |

Bottles from Example 17 were also tested for oxygen permeability by measuring oxygen ingress into bottles using an OxySense™ oxygen measurement system. Duplicate bottles were filled with degassed water, capped with polypropylene closures, and the oxygen concentration over time was monitored using OxySense equipment. From the rate of increase in oxygen concentration between 0.1 and 5 days an oxygen ingress rate and BIF was then calculated. The measured permeabilities and calculated barrier improvement factor (BIF) relative to the control are reported in Table 6 below. As can be seen, significant oxygen barrier improvement was observed for all three examples relative to the control. These examples demonstrate that the barrier additives of the present invention provide enhanced oxygen barrier in oriented PET.

TABLE 7

| (500 ml bottles) | | | |
| --- | --- | --- | --- |
| ID | Description | (ppb O2/day) | BIF |
| PET Control | 0.5% SNS (control) | 122.7 | 1.000 |
| Example 14 | 0.83% additive | 86.3 | 1.42 |
| Example 15B | 0.83% additive | 102.6 | 1.20 |
| Example 16 | 0.71% additive | 96.0 | 1.28 |

These results show that the barrier improvements observed using ethyl acetate as the permeant were also seen with oxygen as the permeant, even though the molecular size and polarity of oxygen is much lower than that of ethyl acetate.

Example 18

Following the teaching of U.S. Pat. No. 4,174,460, 100 grams of P-6A and 23 grams of 35% hydrogen peroxide were heated with stirring in an open beaker at 100° C. for two hours. The product (net weight 102 grams) was analyzed for hydroxyl content by NMR. Based on peak positions and peak integration, it was determined that there was 7.5% hydroxylation of the available phenyl groups.

Example 19

5.0 grams MG70 and 50 grams butanol were placed in a 250 ml round bottom flask fitted with a magnetic stir bar and a reflux condenser. The mixture was heated to reflux with stirring and water of hydration removed via a Dean-Starke trap. After water removal was complete, 12.0 grams of hydroxylated P-6A from Example 17 was added dropwise over a period of about 2 hours with continual azeotropic removal of water of reaction. The reaction mixture was refluxed for an additional 12 hours to ensure completion of reaction. After water distillation ceased, 63.0 grams of poly(diethylene glycol adipate) (MW ~2,500 g/mol) was added and excess butanol distilled off while monitoring of the reaction temperature. After most of the butanol had distilled off at atmospheric pressure, the remaining butanol was distilled off at reduced pressure. The resultant hazy dispersion contained 6.25% hydrotalcite and had approximately 2.5 phosphate groups per 8 metal atoms. Microscopic examination revealed that the hydrotalcite was essentially completely dispersed.

Example 20

5.0 grams MG70 and 50 grams butanol were placed in a 250 ml round bottom flask fitted with a magnetic stir bar and a reflux condenser. The mixture was heated to reflux with stirring and water of hydration removed via a Dean-Starke trap. After water removal was complete, 26.0 grams of hydroxylated P-6A from Example 17 was added dropwise over a period of about 2 hours with continual azeotropic removal of water of reaction. The reaction mixture was refluxed for an additional 12 hours to ensure completion of reaction. After water distillation ceased, 49.0 grams of poly(diethylene glycol adipate) (MW ~2,500 g/mol) was added and excess butanol distilled off while monitoring of the reaction temperature. After most of the butanol had distilled off at atmospheric pressure, the remaining butanol was distilled off at reduced pressure. The resultant slightly hazy dispersion contained 6.25% hydrotalcite and had approximately 5.5 phosphate groups per 8 metal atoms. Microscopic examination revealed that the hydrotalcite was essentially completely dispersed.

Example 21

5.0 grams MG70 and 50 grams butanol were placed in a 250 ml round bottom flask fitted with a magnetic stir bar and a reflux condenser. The mixture was heated to reflux with stirring and water of hydration removed via a Dean-Starke trap. After water removal was complete, 38.9 grams of hydroxylated P-6A from Example 17 was added dropwise over a period of about 2 hours with continual azeotropic removal of water of reaction. The reaction mixture was refluxed for an additional 12 hours to ensure completion of reaction. After water distillation ceased, 36.0 grams of poly(diethylene glycol adipate) (MW ~2,500 g/mol) was added and excess butanol distilled off while monitoring of the reaction temperature. After most of the butanol had distilled off at atmospheric pressure, the remaining butanol was distilled off at reduced pressure. The resultant slightly hazy dispersion contained 6.25% hydrotalcite and had approximately 8 phosphate groups per 8 metal atoms. Microscopic examination revealed that the hydrotalcite was essentially completely dispersed.

Example 22

The barrier additives from Examples 19-22 were mixed with dried DAK Laser+9921 resin at a loading of 0.80% and injection molded into 20.0 gram preforms using a single screw, single cavity Arburg molding machine under standard PET processing conditions, along with a PET control containing 0.5% poly(diethylene glycol adipate). The amount of barrier additive utilized was equivalent to 500 ppm of hydrotalcite (0.05 wt %). The preforms were then subjected to reheat stretch-blow molding into 500 milliliter bottles under standard blow-molding conditions. The injection molding conditions and the blow molding conditions were essentially the same for all variables.

Example 23

10.0 grams of MG70, and 50 grams butanol were placed in a 250 ml round bottom flask fitted with a magnetic stir bar, a Dean-Starke trap and a reflux condenser. The mixture was heated to gentle reflux with stirring for 8 hours while 95 grams of T-6A (about 8 molecules of phosphate per 8 metal atoms) was added dropwise and water of reaction azeotropically distilled off. After water removal was complete, 39.1 grams of canola oil was added and the butanol was distilled off under partial vacuum. The resulting product was 143 grams of a viscous oil with a nominal hydrotalcite loading of 7.0%. The oil was then subjected to high-speed shearing for five minutes in a blender before bottling. Microscopic examination of the oil revealed that the hydrotalcite was essentially completely dispersed, as evidenced by the lack of particulates in the oil.

Example 24

0.40 grams of the oil from Example 21 was placed on an aluminum sheet along with 0.40 grams of maleated polypropylene pellets (Mn of 3,900, 8-10% maleation by weight). The aluminum sheet was then heated on a hot plate to melt the polypropylene pellets, and the two materials were blended together with a spatula. On cooling there was obtained an essentially transparent solid mass. The nominal hydrotalcite loading was about 3.1%. Microscopic examination could find no evidence of platelets or of phase separation. These results are consistent with reaction of the poly(diethylene glycol) with the maleic anhydride units of the maleated polypropylene and subsequent complete dispersion of the compatibilized barrier additive into the functionalized polypropylene matrix.

Example 25

9.79 grams of virgin polypropylene pellets were placed in the bottom of a 500 ml beaker, and 0.18 grams of the barrier additive composition from Example 23 was added. This mixture was placed on a hot plate preheated to 200 deg C., and a 250 ml Erlenmeyer flask was placed on top of the pellets. After the pellets began to melt the Erlenmeyer flask was rotated inside the beaker to effectuate melt mixing. After several minutes of mixing the flask was removed and the beaker set aside to cool. After cooling, the polymer mass was removed and a section cut out of the center. The section was then pressed into a film between two aluminum plates. After quenching and removal of the film, it was examined by optical microscopy. Essentially no particles could be observed, consistent with good dispersion of the barrier additive composition into the polypropylene and lack of reagglomeration of the platelets in the polypropylene matrix. The nominal hydrotalcite loading was about 1260 ppm.

Example 26

9.89 grams of virgin polypropylene pellets were placed in the bottom of a 500 ml beaker, and 0.36 grams of the barrier additive composition from Example 24 was added. This mixture was placed on a hot plate preheated to 200 deg C., and a 250 ml Erlenmeyer flask was placed on top of the pellets. After the pellets began to melt the Erlenmeyer flask was rotated inside the beaker to effectuate melt mixing. After several minutes of mixing the flask was removed and the beaker set aside to cool. After cooling, the polymer mass was removed and a section cut out of the center. The section was then pressed into a film between two aluminum plates. After quenching and removal of the film, it was examined by optical microscopy. No particles could be observed, consistent with good dispersion of the barrier additive composition into the polypropylene and lack of reagglomeration of the platelets in the polypropylene matrix. The nominal hydrotalcite loading was about 1100 ppm.

COMPARATIVE EXAMPLES

The following comparative examples disclose barrier additive compositions, vehicles/compatibilized barrier additive combinations, and process conditions that are outside the scope of the present invention.

Comparative Example A 2.5 grams of boron nitride (average lateral dimensions of 10 microns), 36 grams of T-6A (about 5 molecules of phosphate per 8 nitrogen atoms), and 50 grams butanol were placed in a 250 ml round bottom flask fitted with a magnetic stir bar, a Dean-Starke trap and a reflux condenser. The mixture was heated to gentle reflux with stirring for 8 hours. No water was observed distilling off. When stirring was stopped boron nitride rapidly settled to the bottom of the flask. A sample was removed and examined microscopically. There was no visible difference between the boron nitride particles before or after processing, indicating that no reaction occurred between T-6A and boron nitride under these conditions. This comparative example shows that a neutral layered material with low interlayer spacing (~0.3 nm) does not intercalate and react with a compatibilizer such as T-6A.

Comparative Example B 5.0 grams of expanded vermiculite (average lateral dimensions >50 microns, approximate formula of $Mg_{1.8}Fe^{2+}_{0.9}Al_{4.3}SiO_{10}(OH)_2.4(H_2O)$), 30 grams of T-6A, and 50 grams butanol were placed in a 250 ml round bottom flask fitted with a magnetic stir bar, a Dean-Starke trap and a reflux condenser. The mixture was heated to gentle reflux with stirring for 8 hours. Only a small amount of water was observed distilling off. When stirring was stopped the vermiculite settled to the bottom of the flask. A sample was removed and examined microscopically. There was no visible difference between the vermiculite particles before or after processing, indicating that no significant expansion of the gallery spacing occurred between T-6A and vermiculite under these conditions. This comparative example shows that a cationic layered material with a low ion exchange capacity does not significantly expand its layer spacing on extended exposure to a compatibilizer such as T-6A.

Comparative Example C 5.0 grams MG70 and 50 grams butanol were placed in a 250 ml round bottom flask fitted with a magnetic stir bar, a dropping funnel and a reflux condenser. The mixture was heated to reflux with stirring and water of hydration removed via a Dean-Starke trap. After water removal was complete, 10.0 grams of phenyl phosphonic acid (chain length of ~6 atoms) dissolved in 20 grams of butanol was added dropwise over a period of about 4 hours with continual azeotropic removal of water of reaction. The reaction mixture was refluxed for an additional 6 hours to ensure completion of reaction. After water distillation ceased, 29.6 grams of polyethylene glycol dibenzoate grams was added and excess butanol distilled off while monitoring of the reaction temperature. After most of the butanol had distilled off at atmospheric pressure, the remaining butanol was distilled off at reduced pressure. The resultant thick opaque dispersion contained 11.2% hydrotalcite and had approximately 8 phosphate molecules per 8 metal atoms. Microscopic examination of the product showed that it consisted of a mixture of oil and thick rigid plate-like particles. High speed blending for 2 minutes converted the dispersion into a thin opaque mixture. Microscopic examination showed that the dispersion still consisted of a mass of thick plate-like particles. This result is in contrast to what was observed for Example 16, where with the same vehicle but using a compatibilizer with a longer chain length there was essentially complete dispersion of the hydrotalcite and the resulting composition was viscous and transparent.

Comparative Example D 5.0 grams MG70 and 40 grams butanol were placed in a 250 ml round bottom flask fitted with a magnetic stir bar, a dropping funnel and a reflux condenser. The mixture was heated to reflux with stirring and water of hydration removed via a Dean-Starke trap. After water removal was complete, a solution of 70 grams of TSP-16A in 30 ml butanol was added dropwise over a period of about 4 hours with continual azeotropic removal of water of reaction. The reaction mixture was refluxed for an additional 6 hours to ensure completion of reaction. After water distillation ceased, 25 grams of trioctyltrimellitate was added and excess butanol distilled off while monitoring of the reaction temperature. After most of the butanol had distilled off at atmospheric pressure, the remaining butanol was distilled off at reduced pressure. The resultant hazy dispersion contained 5.0% hydrotalcite and had approximately 4.0 phosphate groups per 8 metal atoms. Microscopic examination of the dispersion showed what appeared to be two liquid phases to be present. The dispersion was subjected to high-speed blending for 1 minute. Further microscopic inspection of the blended dispersion showed no reduction in the droplet size of the dispersion. These results provide a comparative example where a vehicle is not compatible with a compatibilized barrier additive composition, and the vehicle and compatibilized barrier additive composition spontaneously undergo phase separation. This is in contrast to what was observed in Example 16, where the vehicle possessed a better match in solubility parameters to the compatibilized barrier additive and a clear homogeneous dispersion was obtained.

Comparative Example E 5.0 grams of MG70, 36 grams of T-6A (about 6 molecules of phosphate per 8 metal atoms), and 50 grams butanol were placed in a 250 ml round bottom flask fitted with a magnetic stir bar, a Dean-Starke trap and a reflux condenser. The mixture was heated to gentle reflux with stirring for 8 hours and water of reaction was azeotropically distilled off. After water removal was complete, 8.8 grams of ATBC was added and the butanol was distilled off. The resulting product was about 50 grams of a viscous gel with a consistency and color similar to petroleum jelly. The gel had a nominal hydrotalcite loading of 10.0% and a vehicle loading of 17.7%.

Comparative Example F

The barrier additive from Comparative Example E was blended with PET pellets at a 1.0% loading and plaques (1 mm×60 mm×60 mm) were injection molded on a single cavity Arburg under standard PET processing conditions (standard screw but with a mixing head). A PET control was also molded under the same conditions. The resulting plaques were biaxially oriented on a TM Long machine. The resulting PET control films were clear, but the films containing the barrier additive from Example E were translucent. Microscopic examination of the films containing the barrier additive showed a large number of gels, fractured inclusions, and voids around the inclusions. OTR measurement of the control film and the Comparative Example E films showed no difference in oxygen permeability. These results show that at low levels of vehicle there is insufficient dispersion of the compatibilized barrier additive into a polymer matrix under standard melt processing conditions, especially when the vehicle has a relatively low viscosity and migration of vehicle from between the compatibilized surfaces receptive to phosphate compatibilizers to intercalate or exfoliate their layers. Phenylphosphonic acid does not satisfy all of the Key Features, including especially its short chain length of six atoms (excluding the benzene ring). Trioctyltrimellitate does not have a solubility parameter similar to TSP-16A, one of the compatibilizers which does satisfy the Key Features. And, while ATBC is a good vehicle in combination with MG70 hydrotalcite compatibilized with T-6A polyethylene glycol tridecyl ether phosphate, not enough vehicle in the composition dooms its usefulness because of incomplete dispersion.

Table 8 offers a summary comparison of ingredients and properties of the barrier additive compositions of the invention when let-down into PET resin, demonstrating the unexpected BIF results and the calculation of apparent aspect ratio from those BIF results.

The art of food, beverage, and medicament packaging has long sought barrier properties to be added to packaging polymer compounds which could protect against ingress or egress of oxygen, moisture, or carbon dioxide. Table 8 demonstrates the solution to this long-felt need: a barrier composition, in masterbatch form which delicately balances the use of a barrier additive capable of exfoliation by use a compatibilizer and by delivery via a vehicle to be let down into a packaging polymer for passive barrier properties of a tortuous path, such as that seen in FIG. 4.

TABLE 8

| Example No. | MG70 Hydrotalcite (ppm of Resin) | Phosphorus/Metal Mole Ratio | Wt % of Vehicle | Met Key Features? | $O_2$ BIF | $H_2O$ BIF | $CO_2$ BIF | EtOAc BIF | Apparent Aspect Ratio | Resin |
|---|---|---|---|---|---|---|---|---|---|---|
| 5-0 Bottle | 0 | — | — | — | 1.00 | | | | — | PET 1101 |
| 5-1 Bottle | 500 | 2.8/8 | 58.1 | No | 1.01 | | | | 0 | PET 1101 |
| 5-3 Bottle | 500 | 3.4/8 | 53.3 | No | 1.01 | | | | 0 | PET 1101 |
| 5-4 Bottle | 500 | 3.0/8 | 54.8 | No | 0.99 | | | | 0 | PET 1101 |
| 5-0 Pressed Film | 0 | — | — | — | 1.00 | | | | — | PET 1101 |
| 5-1 Pressed Film | 500 | 2.8/8 | 58.1 | Yes (1) | 1.30 | | | | 3370 | PET 1101 |
| 5-3 Pressed Film | 500 | 3.4/8 | 53.3 | Yes (1) | 1.41 | | | | 3940 | PET 1101 |
| 5-4 Pressed Film | 500 | 3.0/8 | 54.8 | Yes (1) | 1.33 | | | | 3535 | PET 1101 |
| 10-0 Bottle | 0 | — | — | — | | 1.00 | 1.00 | | — | PET 1101 |
| 10-6 Bottle | 500 | 7.5/8 | 31.0 | Yes | | 0.96 | 1.22 | | 2886 (4) | EN001 |
| 10-7 Bottle | 500 | 7.9/8 | 32.8 | Yes | | 0.96 | 1.21 | | 2820 (4) | EN001 |
| 10-8 Bottle | 500 | 6.6/8 | 29.0 | Yes | | 0.98 | 1.08 | | 1740 (4) | EN001 |
| 10-9 Bottle | 500 | 4.5/8 | 57.7 | Yes | | 0.93 | 1.19 | | 3573 (4) | EN001 |
| 13-0 Pressed Film | 0 | — | — | — | 1.00 | | | | — | PET 1101 |
| 13-11 Pressed Film | 980 | 8.0/8 | 55.9 | Yes (1) | 2.78 | | | | 4189 | PET 1101 |
| 13-12 Pressed Film | 980 | 8.0/8 | 39.2 | Yes (1) | 2.37 | | | | 3675 | PET 1101 |
| 13-0 Oriented Film | 0 | — | — | — | 1.00 | | | | — | PET 1101 |
| 13-11 Oriented Film | 980 | 8.0/8 | 55.9 | Yes (2) | 1.14 | | | | 1174 | PET 1101 |
| 13-12 Oriented Film | 980 | 8.0/8 | 39.2 | Yes (2) | 1.03 | | | | 544 | PET 1101 |
| 17-0 Bottle | 0 | — | — | — | 1.00 | | | 1.00 | — | PET 1101 |
| 17-14 Bottle | 500 | 8.0/8 | 39.7 | Yes | 1.42 | | | 1.77 | 5400 (5) | PET 1101 |
| 17-15A Bottle | 500 | 8.0/8 | 39.7 | Yes | | | | 1.03 | 1065 (5) | PET 1101 |
| 17-15B Bottle | 500 | 8.0/8 | 39.7 | Yes | 1.20 | | | 1.44 | 4082 (5) | PET 1101 |
| 17-16 Bottle | 350 | 4.0/8 | 49.5 | Yes | 1.28 | | | 1.26 | 4483 (5) | PET 1101 |
| F-Control Oriented Film | 0 | — | — | — | 1.00 | | | | — | PET 1101 |
| F-E Oriented Film | 1000 | 6.0/8 | 17.7 | Yes (3) | 1.00 | | | | | PET 1101 |

(1) Met Key Features for compression molded film but failed to meet surface adhesion feature in oriented film.
(2) Met Key Features for compression molded film but was marginal for oriented film.
(3) Met Key Features but was unable to be processed into the polyester.
(4) Based on $CO_2$ Barrier
(5) Based on EtOAc Barrier barrier additive layers may be rapid relative to the rate of intercalation of polymer chains.

Discussion of Results

Comparative Examples A-F demonstrate why only certain barrier additives, compatibilizers, and vehicles are useful in this invention. Boron nitride and vermiculite do not have As seen in Table 8, BIF for passive barrier for oxygen ranges from 1.30 to 2.78 for amorphous films (Examples 5-1, 5-3, 5-4, 13-11 and 13-12) and from 1.03 to 1.14 for oriented films (Examples 13-11 film and 13-12 film). While oxygen barrier performance for oriented sidewalls of polyesters is not significant, the use of the same ingredients in amorphous films is significant, at least 30% and as much as 178% better (Example 5 wall data vs. Example 5 film data.)

Most surprising was the results of Examples 17-14, 17-15B, and 17-16 which had oxygen BIF data of 1.42, 1.20, and 1.28—all very commercially useful compositions for excellent passive oxygen barrier which as of the date of this invention usually is about the same for MXD6 additives in polyester bottle sidewalls, but at much lower loadings than for MXD6, as much as 90% lower. Lower loadings means less quantity of an ingredient different from the polymer matrix and less haze caused by different refractive indices of the multiple materials in the sidewall of a polymer container.

For carbon dioxide and its ethylene acetate surrogate, both Examples 10 and 17 provide much unexpected results. Both Examples used an injection blow molding machine with operating parameters similar to commercial equipment. With the exception of Example 17-15A which had dispersion issues, both Examples achieved BIF values in PET bottle sidewalls of at least 1.08 and as much as 1.76—an improvement over the control of from 8% to 76% with an effective amount of inorganic barrier additive of only 0.035% to 0.05% (350 ppm to 500 ppm). For comparison, where passive barrier has been obtained in compression molded PET using montmorillonite-based barrier additives, inorganic loadings of 2-5% have been required, two orders of magnitude more than the amounts of substantially exfoliated hydrotalcite in the working examples shown in Table 8. In the case of oriented PET, there appears to be no prior examples of barrier improvements in the technical literature, regardless of loading levels.

Using the equation for Apparent Aspect Ratio subsequent to Table 4 above, even more unexpected results are achieved. Even the worst apparent aspect ratio of more than 500 for the oriented film of Example 13-12 is significantly greater than any currently known mineral additive for polyester in use in films or bottle sidewalls. Achieving Apparent Aspect Ratio values of more than 1000, 2000, and even 5000 for the working examples summarized in Table 8 is a breakthrough in passive barrier additives in polymers. These values are indicative of the incredibly difficult tortuous path along which any oxygen molecule trying to ingress a container wall or filmed package, or along which any carbon dioxide molecule trying to egress across the container wall or filmed package, must migrate.

Table 8 concludes with an important caution. The formulation of Comparative Example E was just too additive-heavy for processing—a viscous gel which needed much more weight percent of vehicle to be useful. At least about 20 weight percent of vehicle is believed to be needed, with at least 30 weight percent of vehicle desired and more than about 40 weight percent preferred for good processing of the barrier additive in masterbatch form for use into polymer resin.

Using Table 8 and its correlations to Tables 1-7 of the Examples, one having ordinary skill in the art can find an appropriate combination of barrier additive, compatibilization agent, and vehicle to provide a composition for use in packaging polymer containers to provide passive barrier performance for both oxygen and carbon dioxide in a manner heretofore not possible.

Based on the results of Table 8, it is contemplated that a compatibilized barrier additive composition can have an apparent aspect ratio ranges from about 500 to about 50,000 and preferably from about 2500 to about 40,000.

It is also contemplated that a compatibilized barrier additive composition can have a mole ratio of compatibilizer to metal atoms from about 0.25 to about 1.0 and preferably from about 0.3 to about 1.0.

It is contemplated that a polymer article can have from about 0.01 to about 10 and preferably from about 0.1 to about 5 weight percent of the compatibilized barrier additive composition.

It is contemplated that a polymer article can have a BIF for oxygen ranging from about 1.10 to about 1000 and preferably from about 2 to about 100.

It is contemplated that a polymer article can have a BIF for carbon dioxide ranging from about 1.10 to about 1000 and preferably from about 2.0 to about 100.

It is contemplated that a polymer article can have barrier additives with an apparent aspect ratio of from about 500 to about 50,000 and preferably from about 2500 to about 40,000.

It is contemplated that a polymer article can have a BIF for oxygen ranging from about 1.30 to about 2.78 when the article is an amorphous film.

It is contemplated that a polymer article can have a BIF for oxygen ranging from about 1.03 to about 1.14 when the article is an oriented film.

It is contemplated that a polymer article can have a BIF for carbon dioxide ranging from about 1.08 to about 1.22 when the article is an oriented bottle sidewall, and wherein the amount of the barrier additive ranges from 0.035 to 0.05 weight percent of the bottle sidewall.

All of the features disclosed in this specification (including any accompanying claims, abstract, and drawings), and/or all of the steps of any method or process so disclosed, can be combined in any combination, except combinations where at least some of such features and/or steps are mutually exclusive.

Each feature disclosed in this specification (including any accompanying claims, abstract, and drawings) can be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combinations, of the features disclosed in the specification (including any accompanying claims, abstract, and drawings), or the novel one, or any novel combination, of the compositions or steps of any method or process so disclosed.

The invention is not limited to the above embodiments. The claims follow.

What is claimed is:

1. A barrier additive composition for providing passive barrier properties to a polymer composition comprising a preselected polymer selected from the group consisting of polyesters, polyolefins, and polyamides, the barrier additive composition comprising:
   (a) a compatibilized barrier additive, wherein the compatibilized barrier additive is a reaction product of:
      (i) a layered inorganic barrier additive precursor, wherein the layered inorganic barrier additive precursor is a layered double hydroxide; and
      (ii) an organic compatibilization agent, wherein the organic compatibilization agent is an organic phosphate or phosphonate; and
   (b) a vehicle for the compatibilized barrier additive, wherein:

(i) if the preselected polymer is a polyester or a polyamide, the vehicle is selected from the group consisting of dioleates, citrates, adipates, dibenzoates, hydrogenated and acetylated oil monoglycerides, and combinations thereof; and
(ii) if the preselected polymer is a polyolefin, the vehicle is selected from the group consisting of mineral oils, unsaturated vegetable oils, and combinations thereof.

2. The barrier additive composition according to claim 1, wherein the layered double hydroxide has the general formula $M^{+2}_{8-x}M^{+3}_{x}(OH)_{16}\cdot 4H_2O(CO_3)_{x/2}$.

3. The barrier additive composition according to claim 2, wherein $M^{+2}$ is selected from divalent cations of magnesium, calcium, strontium, manganese, cobalt, nickel, copper, and zinc.

4. The barrier additive composition according to claim 3, wherein $M^{+3}$ is selected from trivalent cations of chromium, iron, aluminum, gallium, indium, yttrium, and the lanthanides.

5. The barrier additive composition according to claim 4, wherein $M^{+2}$ is magnesium and $M^{+3}$ is aluminum.

6. The barrier additive composition according to claim 1, wherein the organic phosphate or phosphonate is covalently bonded to the surface of the layered inorganic barrier additive precursor.

7. The barrier additive composition according to claim 1, wherein the layered inorganic barrier additive precursor has an apparent aspect ratio ranging from about 500 to about 50,000.

8. The barrier additive composition according to claim 7, wherein the apparent aspect ratio ranges from about 2500 to about 40,000.

9. The barrier additive composition according to claim 1, wherein the organic compatibilization agent is a polyethylene glycol phenyl ether phosphate.

10. The barrier additive composition according to claim 1, wherein the organic compatibilization agent is selected from the group consisting of a polyethylene glycol tridecyl ether phosphate; a polyethylene glycol phenyl ether phosphate; a polyethylene glycol tristyrylphenyl ether phosphate; and combinations thereof.

* * * * *